US006907404B1

(12) United States Patent
Li

(10) Patent No.: US 6,907,404 B1
(45) Date of Patent: Jun. 14, 2005

(54) AUTOMATED INVESTMENT CHART PATTERN SEARCH SYSTEM FOR TECHNICAL ANALYSIS

(75) Inventor: Bin Li, Westport, CT (US)

(73) Assignee: Wsetport Financial LLC., Westport, CT (US)

( * ) Notice: Subject to any disclaimer, the term of this patent is extended or adjusted under 35 U.S.C. 154(b) by 650 days.

(21) Appl. No.: 09/640,030

(22) Filed: Aug. 16, 2000

Related U.S. Application Data

(60) Provisional application No. 60/149,067, filed on Aug. 16, 1999.

(51) Int. Cl.[7] .............................................. G06F 17/60
(52) U.S. Cl. .............................. 705/36; 705/35; 705/38; 705/39
(58) Field of Search .............................. 705/35, 36, 37

(56) References Cited

U.S. PATENT DOCUMENTS

| | | | | |
|---|---|---|---|---|
| 4,554,418 A | * | 11/1985 | Toy ................................ 179/2 |
| 5,379,366 A | * | 1/1995 | Noyes .......................... 395/54 |
| 5,446,890 A | * | 8/1995 | Renslo et al. ................ 395/600 |
| 5,594,837 A | * | 1/1997 | Noyes .......................... 395/63 |
| 5,668,897 A | * | 9/1997 | Stolfo ......................... 382/283 |
| 5,701,400 A | * | 12/1997 | Amado ........................ 395/76 |
| 5,774,878 A | * | 6/1998 | Marshall ....................... 705/35 |
| 5,806,047 A | * | 9/1998 | Hackel et al. ................. 705/36 |
| 5,845,285 A | * | 12/1998 | Klein .......................... 707/101 |
| 5,878,406 A | * | 3/1999 | Noyes .......................... 706/55 |
| 5,933,816 A | * | 8/1999 | Zeanah et al. ................. 705/35 |
| 5,946,666 A | * | 8/1999 | Nevo et al. ................... 705/36 |
| 6,021,397 A | * | 2/2000 | Jones et al. ................... 705/36 |
| 6,064,984 A | * | 5/2000 | Ferguson et al. ............. 705/36 |

OTHER PUBLICATIONS

Hirotaka M. et al., A method of chart analysis by pattern classification in securities trading, Human Interface, Japan, 1989, vol. 5, pp. 159–162 (full text in Japanese and Abstract in English).*
Building Bridges, in Dealing with Technology, vol. 1, No. 3, pN/A, Jan. 1998.*

(Continued)

*Primary Examiner*—Hyung Sough
*Assistant Examiner*—P Kanof
(74) *Attorney, Agent, or Firm*—St. Onge Steward Johnston & Reens LLC

(57) ABSTRACT

An automated investment chart pattern search system is provided. The system includes a computer, a historical information database accessible by the computer having historical information for a plurality of investments stored thereon, a connection to a supply of real-time data, the real time data comprising real-time data relating to a plurality of investments, and a templates database accessible by the computer having a plurality of templates stored thereon. Software executing on the computer generates an investment chart for the investment to be examined based upon the historical information and the real-time data relating to the investment to be examined. Software executing on the computer then retrieves at least one template from the templates database, and performs geometric projection analysis on the retrieved template and the investment chart to determine if a pattern exists in the investment chart. Next, software executing on the computer retrieves at least one template from the templates database, and performs template matching analysis on the retrieved template and the investment chart to determine if a pattern exists in the investment chart. Software executing on the computer then performs projection line analysis on the investment chart to determine if a pattern exists in the investment chart.

64 Claims, 21 Drawing Sheets

ALL CROSSES BELOW ITS OWN 20 DAY MOVING AVERAGE. IT MAY CONTINUE DOWNWARD

OTHER PUBLICATIONS

Kinoshita H. et al., Image Retrieval Method based on Graph Matching of Structured Information, Terebijon Gakkaishi (Journal of the Institute of Television Engineers of Japan), vol. 49, No. 7, pp. 913–922, 1995 (full text in Japanese and Abstract in Engl.*

Holly, S; Analyzing, visualizing real–time market data, Bank Systems & Technology, vol. 33, No. 5, p. 27, New York.*

Hirotaka, M. et al., A method of chart analysis by pattern classification in securities trading, Human Interface, Japan, 1989, vol. 5, pp. 159–162 (full text in Japanese and in English, 13–pages.*

Kinoshita H. et al., Image Retrieval Method based on Graph Matching of Structured Information, Terebijon Gakkaishi (Journal of the Institute of Television Engineers of Japan), vol. 49, No. 7, pp. 913–922, 1995 (full text in Japanese and in English, 25–.*

Douglas F. Riddle, "Calculus and Analytic Geometry", 3th ed., 1979, Wasdsworth Publishing Co., Inc., California, pp. 261–277.*

* cited by examiner

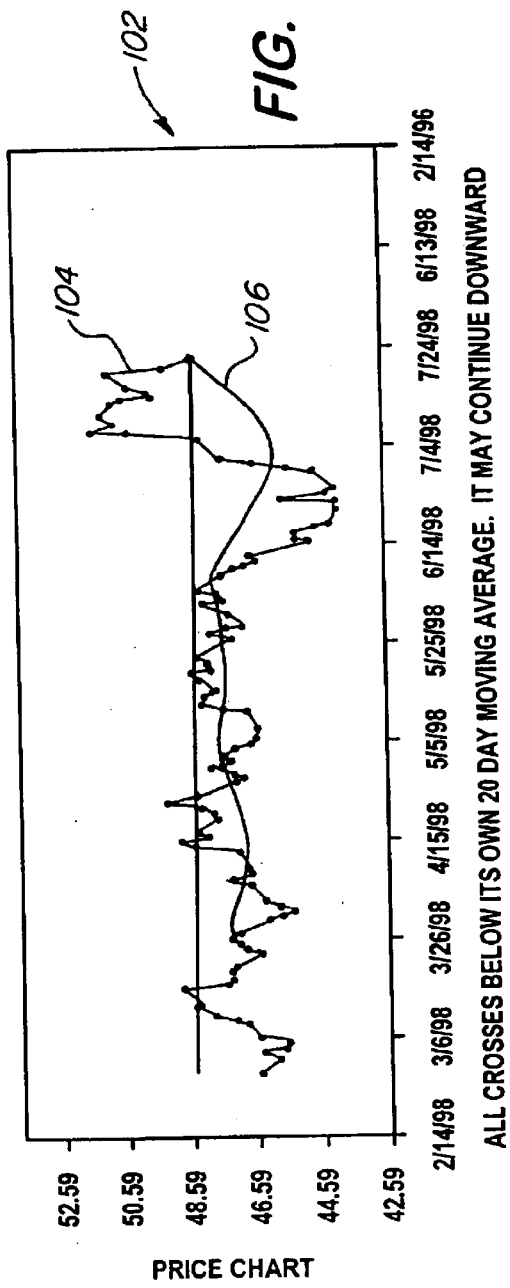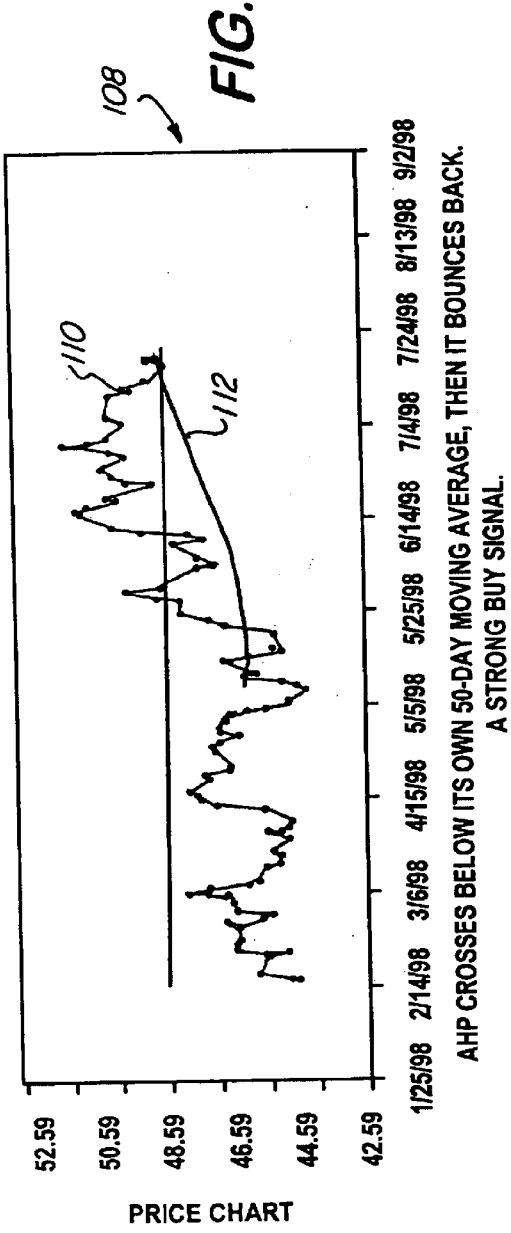

AUTOMATED INVESTMENT CHART PATTERN SEARCH SYSTEM FOR TECHNICAL ANALYSIS

FIELD OF THE INVENTION

The present application claims the benefit of U.S. Provisional Patent Application No. 60/149,067, filed Aug. 16, 1999.

FIELD OF THE INVENTION

The present invention relates to an automated system for assisting investors in deciding whether to buy or sell certain investments, and more particularly to such a system which automatically analyzes investment chart patterns to determine whether certain buy or sell indicators are present.

BACKGROUND OF THE INVENTION

Many investment analysts and traders design trading strategies and make decisions based on technical analysis. They believe that publicly available technical data of an investment—such as the historical open, high, low, close prices, daily volumes, the last trade price and size, real-time bid/ask prices and bid/ask sizes—contain a certain amount of information that can be used to some extent to predict the future price movements of the investment and that, therefore, analyzing this data can help them make profits.

Over the course of the past 50 years, investment analysts have developed a group of indicators based on the market data of investments. For example, moving averages (MA), relative strength indexes (RSI), K/D stochastic analysis, moving average convergence and divergence (MACD), Bollinger bands, and various indexes are among the most popular indicators the general public uses to describe individual investments as well as the market as a whole. For the purpose of analyzing investments and designing trading strategies, traders and analysts plot investment prices, volumes and other indictors in a graph and call it an investment chart. Most people find these investment charts very useful. Technical analysis is all about constructing investment charts and analyzing them to draw conclusions about an investment: when to buy it and when to sell it.

Technical analysts and traders believe that certain investment chart shapes and patterns hint buy and sell opportunities. Many professional and amateur traders claim that they consistently made trading profits by following those buy and sell signals.

Nowadays computers can conveniently draw investment charts with volumes and various other indicators. The most popular device is the trade station. A typical trade station stores investment data in a local database and receives the real-time investment prices and volumes from a data vendor by means of a telephone line, a designated data line or a satellite dish. The user of a trade station can create various types of live (real-time) investment charts on the screen, and draw different types of lines or curves on the chart to help analyze the investment.

The average trader sits at the screen of a trade station during trading hours, listens to the financial news, investigates all possible investment symbols he/she can think of, and examines all the investment charts on the screen. Occasionally he/she finds an investment that shows a typical buy or sell pattern. Then he/she researches other available information about the investment before finally deciding to buy, sell or short the investment. Later on, if the investment moves against him/her, indicating that his/her original analysis is no longer valid, he/she unwinds the trade to cut loss. If the investment moves as he/she had expected, he/she raises the stop level to protect the profits.

The key to technical trading is to find those typical buy or sell patterns from the market. Some traders work very hard looking for good trading signals. Besides constantly screening through the investments during trading hours, they examine hundreds or even thousands of investments every day after hours, looking for candidates that may develop into certain patterns in the next trading day. Because good signals are rare, it is difficult for traders to find them when they are still valid. For this reason, traders sometimes cut corners. Under the pressure to trade, they may have to accept less-than-perfect patterns and execute trades. Or if they finally find a perfect pattern, they tend to put on more capital in a single trade than they should for optimal risk management. Of course, the better alternative is to diversify the trading capital into a few very good trades, provided that they can be found.

Some conventional trade stations allow users to search for investments that meet certain criteria, such as conditions on the price, volume and other indicators. However, these tools require that the users input their own search criteria. This is disadvantageous because most users do not know what criteria will lead to good trading signals. Furthermore, because these search tools are so simplistic, no matter what search criteria a user inputs the search often results in information of little use. Moreover, the trade stations and other software available in today's market do not offer users the ability to search for investment chart patterns.

What is desired, therefore, is an automated system for assisting investors in deciding whether to buy or sell investments which automatically analyzes investments to determine if buy or sell indicators are present, which is capable of automatically analyzing a large number of investments without requiring user input, which is capable of quickly identifying buy or sell indicators so that they can be acted upon while they are still valid, which automatically analyzes investment charts to draw conclusions about investments, which is capable of identifying a variety of pertinent investment chart patterns indicative of buy or sell indicators, and which is capable of detecting subtle investment chart patterns which may otherwise be missed by an individual manually examining investment charts.

SUMMARY OF THE INVENTION

Accordingly, it is an object of the present invention to provide an automated system for assisting investors in deciding whether to buy or sell investments, which automatically analyzes investments to determine if buy or sell indicators are present.

Another object of the present invention is to provide a system having the above characteristics and which is capable of automatically analyzing a large number of investments without requiring user input.

A further object of the present invention is to provide a system having the above characteristics and which is capable of quickly identifying buy or sell indicators so that they can be acted upon while they are still valid.

Still another object of the present invention is to provide a system having the above characteristics and which automatically analyzes investment charts to draw conclusions about investments.

Yet a further object of the present invention is to provide a system having the above characteristics and which is capable of identifying a variety of pertinent investment chart patterns indicative of buy or sell indicators.

Still a further object of the present invention is to provide a system having the above characteristics and which is capable of detecting subtle investment chart patterns which may otherwise be missed by an individual manually examining investment charts.

These and other objects of the present invention are achieved by provision of an automated investment chart pattern search system, which includes a computer, a information database accessible by the computer having historical information for a plurality of investments stored thereon, a connection to a supply of real-time data, the real time data comprising real-time data relating to a plurality of investments, and a templates database accessible by the computer having a plurality of templates stored thereon. Software executing on the computer generates an investment chart for the investment to be examined based upon the historical information and the real-time data relating to the investment to be examined. Software executing on the computer then retrieves at least one template from the templates database, and performs geometric projection analysis on the retrieved template and the investment chart to determine if a pattern exists in the investment chart. Next, software executing on the computer retrieves at least one template from the templates database, and performs template matching analysis on the retrieved template and the investment chart to determine if a pattern exists in the investment chart. Software executing on the computer then performs projection line analysis on the investment chart to determine if a pattern exists in the investment chart.

Preferably, software executing on the computer pre-screens the historical information and the real-time data relating to the investment to be examined to determine whether the investment to be examined meets a threshold value for liquidity, and the software executing on the computer performs the geometric projection analysis, the template matching analysis and the projection line analysis only if the investment to be examined meets the threshold value for liquidity. Preferably, the investment to be examined is determined to meet the threshold value for liquidity if both average daily trading volumes and average daily prices for the investment to be determined meet a threshold value. Most preferably, the investment to be examined is determined to meet the threshold value for liquidity if the current day's trading volume is higher than average daily trading volumes.

Preferably, the system also includes software executing on the computer for, if it is determined that a pattern exists in the investment chart, generating and transmitting to a user an indication that a pattern has been found.

The invention and its particular features and advantages will become more apparent from the following detailed description considered with reference to the accompanying drawings.

BRIEF DESCRIPTION OF THE DRAWINGS

FIGS. 1A and 1B are schematic views of investment charts illustrating moving average crosses investment chart patterns;

DETAILED DESCRIPTION OF THE INVENTION

Figure 2A:
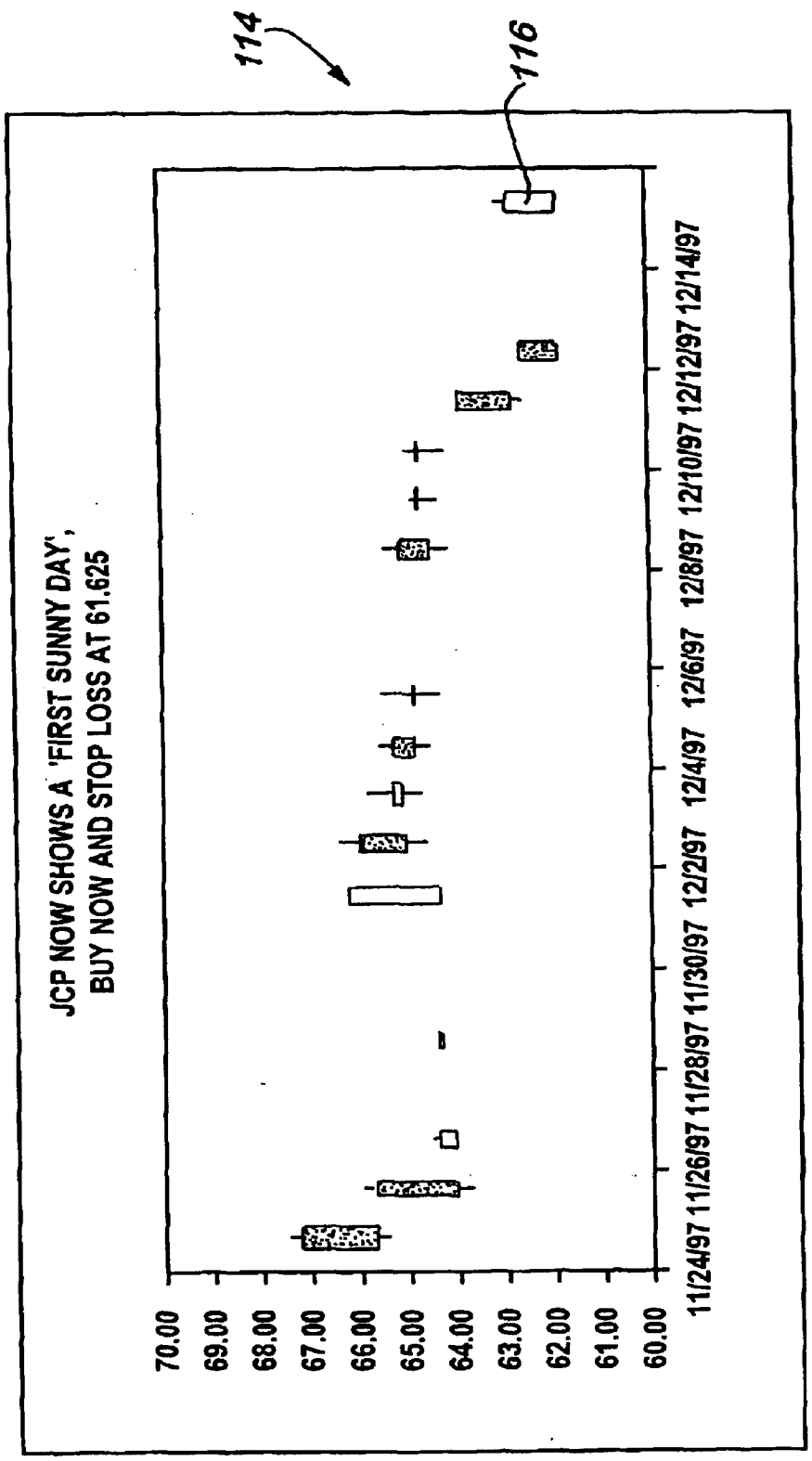
FIGS. 2A through 2D are schematic views of investment charts illustrating candlestick trend investment chart patterns.

Technical analysts and traders believe that certain investment chart patterns and shapes provide signals of profitable trading opportunities. Many professional and amateur traders claim that they consistently make trading profits by following such signals. Referring now to FIG. 1A through FIG. 9B, several known types of investment patterns and the corresponding trading strategies that give the investor a strategic trading advantage are shown. As the actual investment chart patterns, and their corresponding meanings, are known to those skilled in the art, only a brief description of each is given here.

Referring first to FIGS. 1A and 1B, the evolution of investment prices over time can be seen as a shorter-term, random oscillation, on top of a longer-term trend. Most investments show a rather "rhythmic" short-term oscillation with a typical cycle of about 14 to 25 days. If we assume that such a cycle does exist, we can predict that the investment price will continue to go through the moving average line after it is crossed, as illustrated in FIG. 1A. More specifically, FIG. 1A shows an investment chart 102 illustrating an investment price 104 as it crosses down through its 20-day moving average 106 with a large momentum. This is a likely down pattern, and a sell indicator.

For an investment in an obvious long-term trend, the 50-day moving average line usually damps out most of the shorter-term oscillations; therefore, this can be used as a reliable "moving support line." A good trading strategy is to buy the investment if it is in an up trend and if the price bounces back up after it touches or lightly penetrates the 50-day moving average. FIG. 1B shows an investment chart 108 illustrating an investment price 110 touching its 50-day moving average 112 which is in an up trend. The corresponding opposite trading strategy is to "short" the investment if it is in a down trend and if the prices drops back down after it touches or lightly penetrates the 50-day moving average.

Figure 2B:
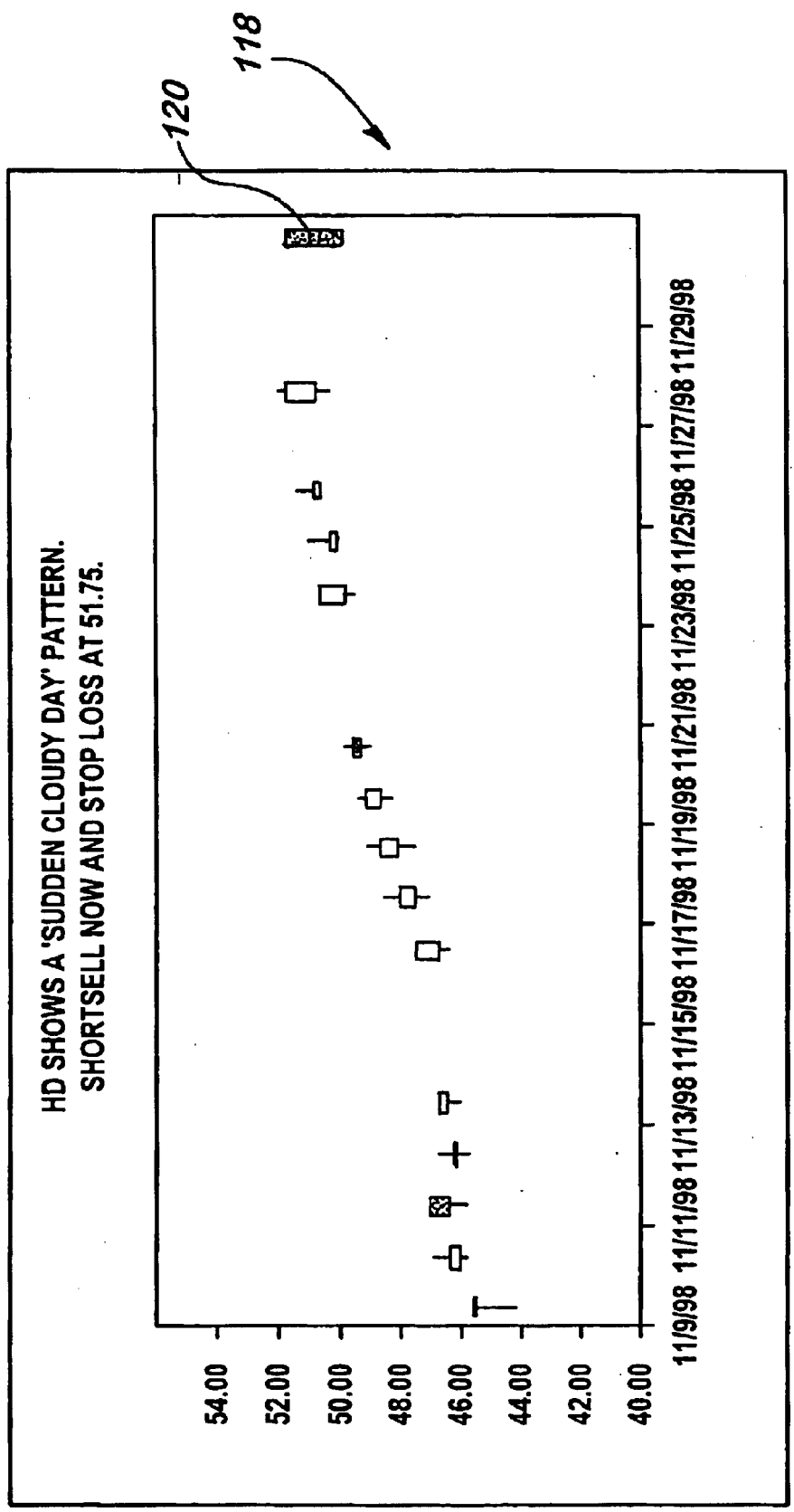
Figure 2C:
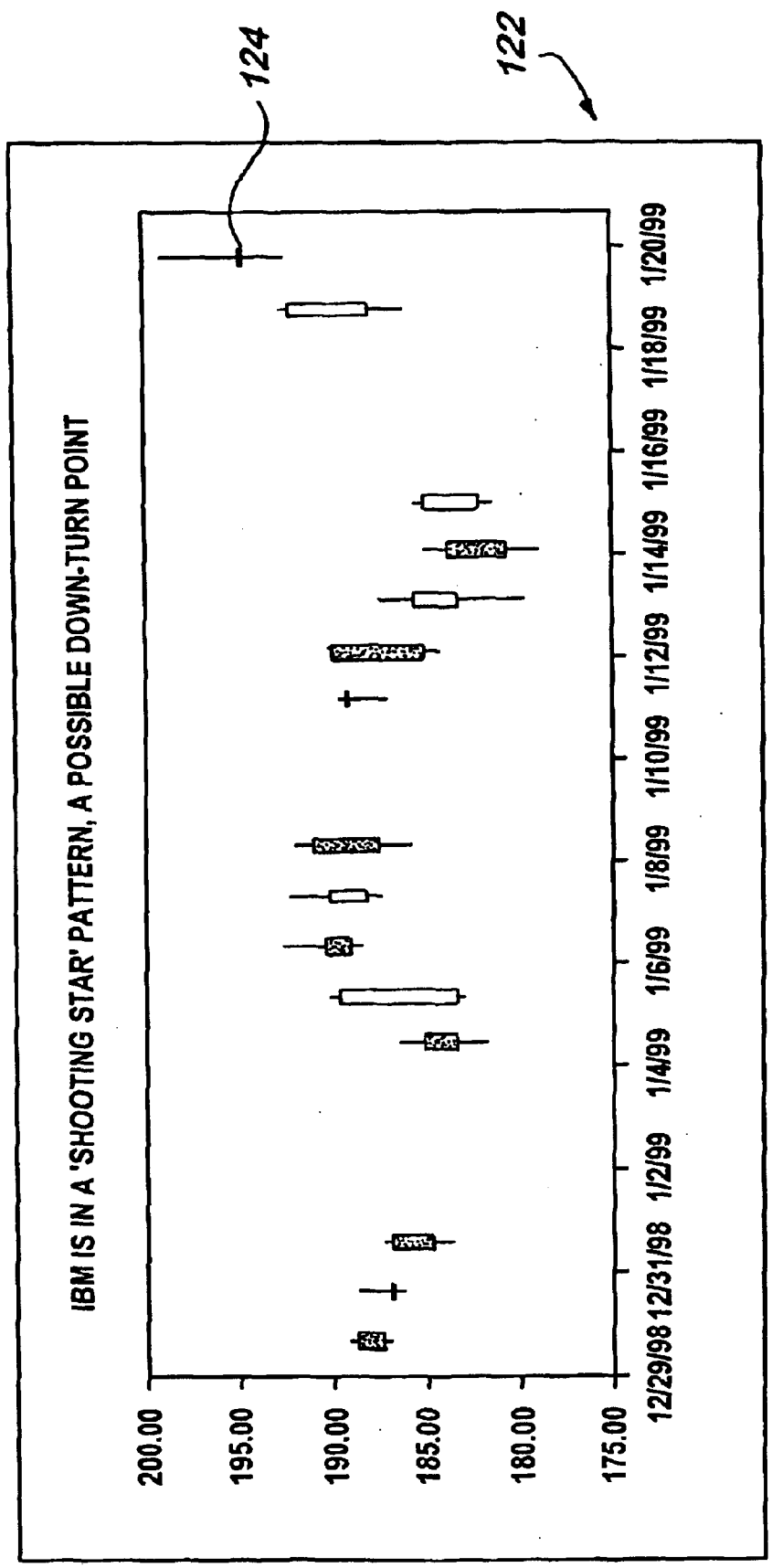
Figure 2D:
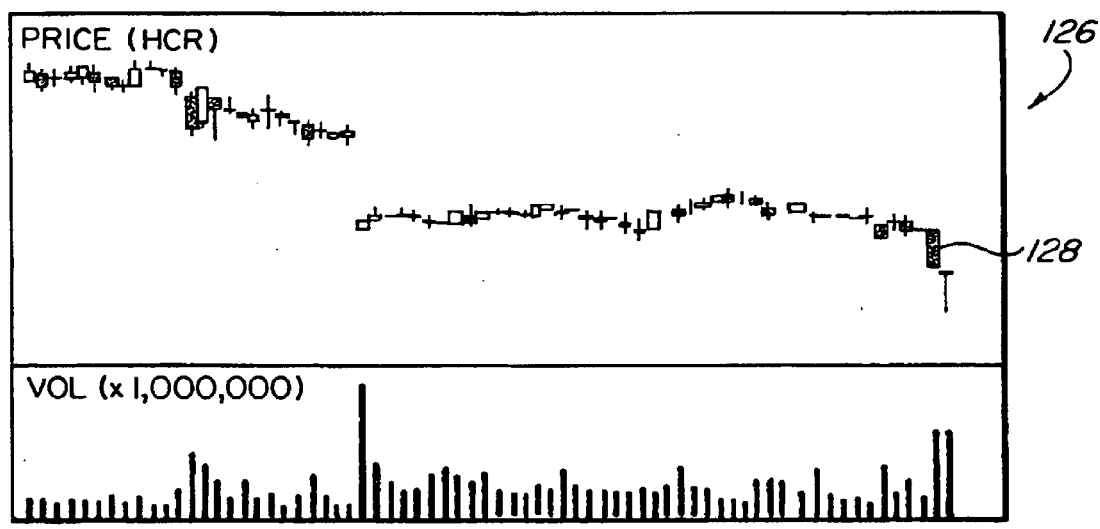

A candle stick chart is a good presentation of an investment's momentum. On a candlestick chart, one can easily see the secession of up days, down days and sudden changes in the investment pattern. Thus, candlestick charts are desirable for viewing trend reversal patterns, as are shown in FIGS. 2A through 2D. FIG. 2A shows a trend reversal pattern that is sometimes called a "First Sunny Day" pattern. As shown in investment chart 114, after a long, long decline, the investment price 116 suddenly goes up in significant magnitude. Furthermore, it closes much higher above its open. This First Sunny Day pattern sends a short-term buy signal. The trading strategy for a First Sunny Day pattern is to buy the investment and hold until it recovers the range lost by the recent secession of down days, or to cut losses if it drops back to the prior day's low. This pattern usually signals a very good profit-risk ratio. The converse trend reversal pattern, shown in FIG. 2B, is sometimes called a "Sudden Cloudy Day" pattern. As illustrated in investment chart 118, after a long, long rise, the investment price 120 suddenly drops; its close is much lower than its open. This pattern hints that something has suddenly gone wrong with the investment, and indicates that one should sell the investment without delay. In this example of the Sudden Cloudy Day pattern, the trading strategy is to short the investment and hold it until it retraces the recent secession of up days or to cut losses if it breaks the previous day's high.

For longer-term trend-reversal patterns, we often look for the "Shooting Star" or for "T-Shape" patterns. In the investment chart 122 illustrated in FIG. 2C, the investment price 124 soared considerably in the past few days. At present, it shoots up, as if exhausting all its energy. This Shooting Star pattern hints that the market has lost confidence in the further potential of the investment, indicating a likely downturn. Conversely, in the investment chart 126 illustrated in FIG. 2D, the investment price 128 dropped over several days. Presently, it drops precipitously, then bounces back to close near the open, forming a "T" shape. This may indicate that the market has finally decided the investment price has dropped enough, with many bullish traders and investors coming to the rescue.

Figure 3:
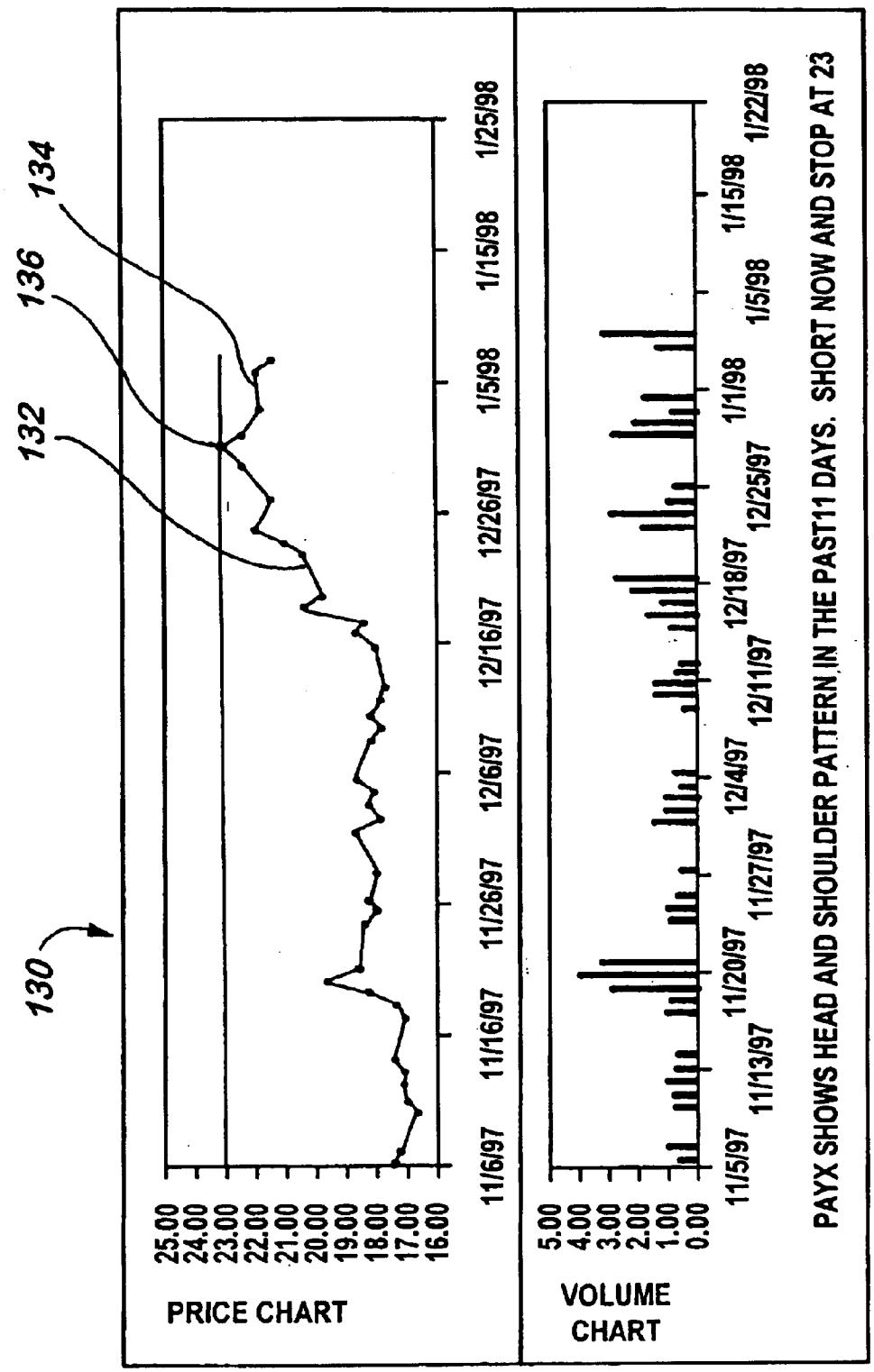
FIG. 3 is a schematic view of an investment chart illustrating a head-and-shoulders investment chart pattern.

The "Head-and-Shoulders" pattern is believed to be one of the most reliable trend-reversal patterns. FIG. 3 shows an investment chart 130 illustrating an example of a short-term Head-and-Shoulders pattern. The strategy indicated by the Head-and-Shoulders pattern is to short-sell the investment as the price 132 drops down the second shoulder 134, especially if the volume also goes up. Then one can hold the position until the price drops all the way down to the level of significant supports and consolidation. This signal also indicates that one should cut loss if the price rises above the tip of the head 136. A less-risky stop-loss strategy is to cut losses if the price goes back up the top of the second shoulder 134.

Figure 4A:
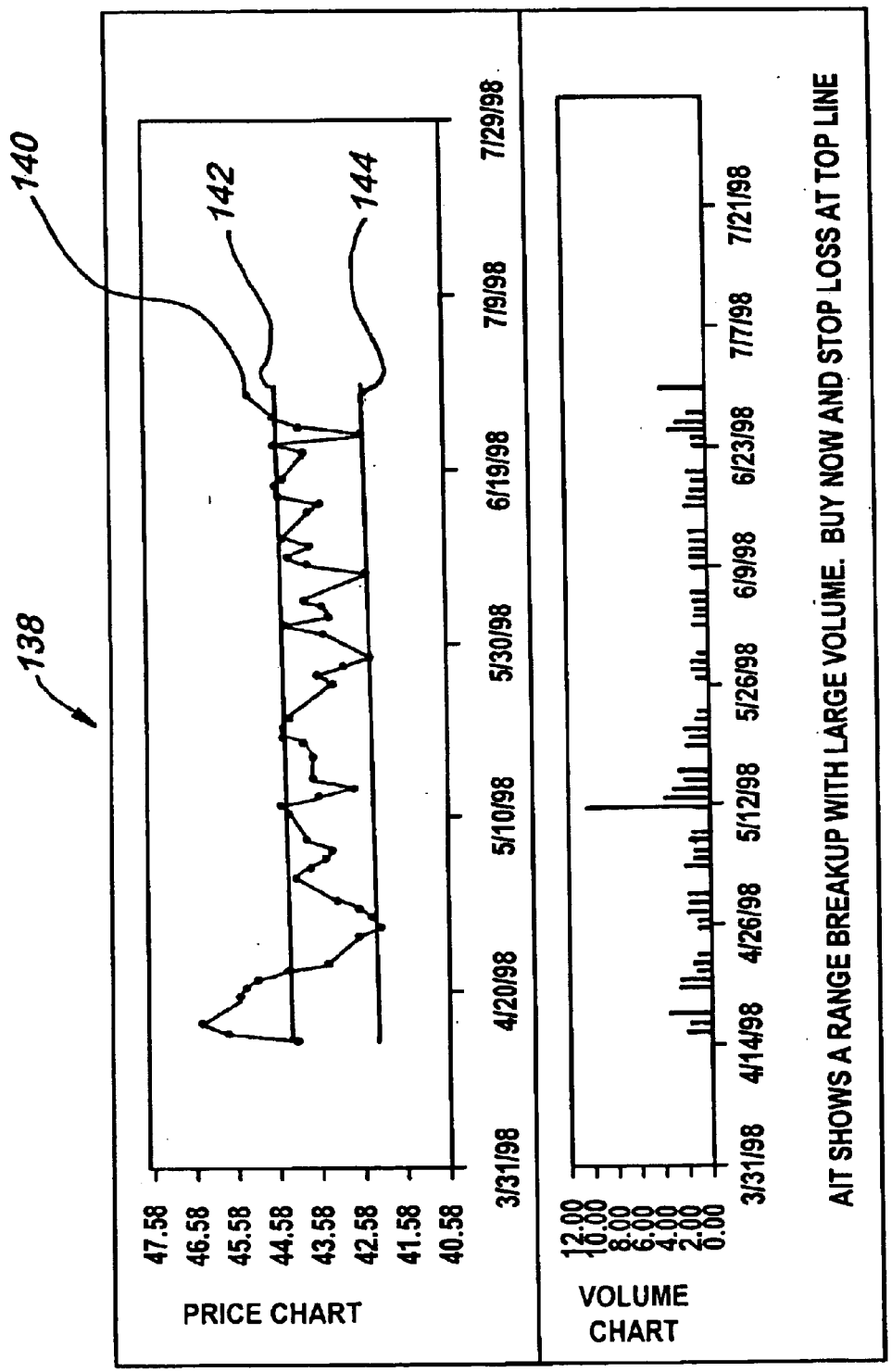
FIGS. 4A and 4B are schematic views of investment charts illustrating range breakout investment chart patterns.
Figure 4B:
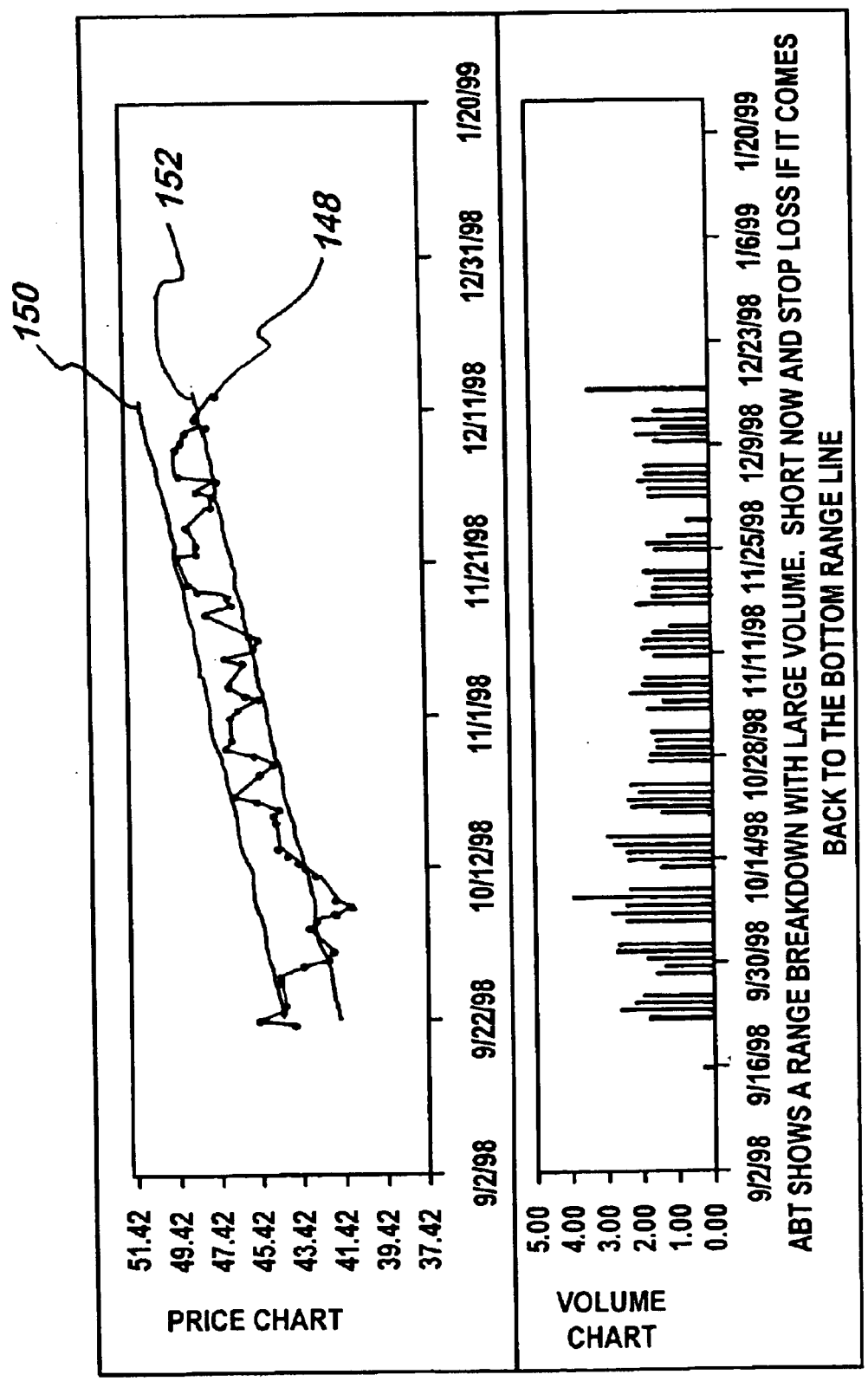

Another type of investment chart pattern is known as the "Range Breakout" pattern. In FIG. 4A an investment chart 138 illustrating a typical Range Breakup pattern, a strong buy signal, is shown. Note that the investment price 140 breaks out of the trading range defined by the two range lines 142, 144 with large volume. The trading strategy for a Range Breakup is just the opposite as that of a Head-and-Shoulders: the pattern indicates a strategy of buying as the investment breaks the upper range line with larger-than-average volume, and continuing to hold until the investment has risen a distance comparable to the height of the range. If the price goes down instead, one should stop losses as it penetrates the upper range line. In FIG. 4B an investment chart 146 illustrating a typical Range Breakdown pattern, a strong sell signal, is shown. Here, the investment price 148 breaks out of the trading range defined by the two range lines 150, 152 with large volume. The trading strategy for a Range Breakdown is just the opposite as that of a Range Breakup: sell as the investment breaks the lower range line with larger than average volume, and continue to hold until the investment has fallen a distance comparable to the height of the range. If the price goes up instead, one should stop loss as it penetrates the lower range line.

Figure 5A:
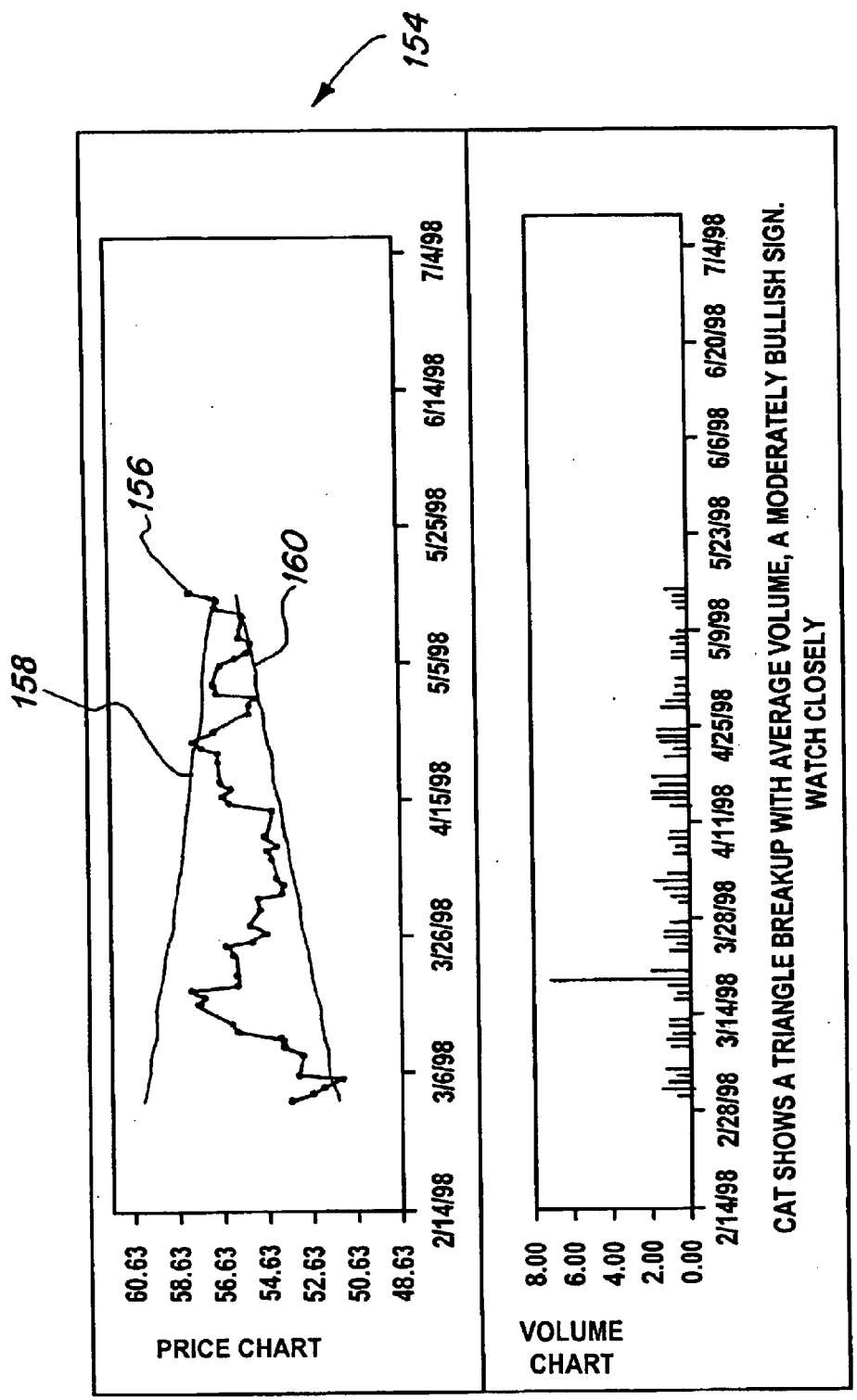
FIGS. 5A and 5B are schematic views of investment charts illustrating triangle breakout investment chart patterns.
Figure 5B:
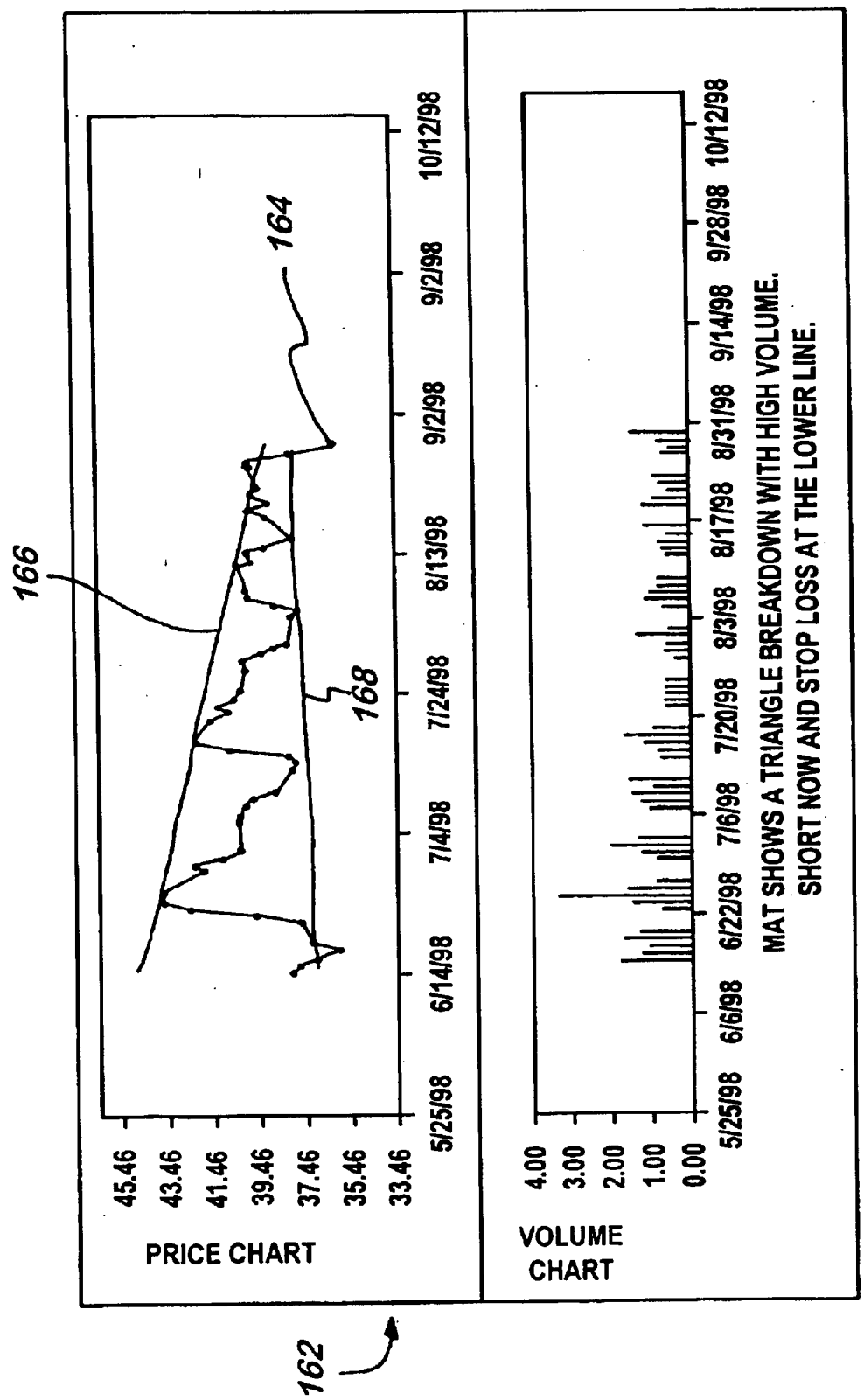

Referring now to FIGS. 5A and 5B, investment chart patterns known as "Triangle Breakouts" are shown. FIG. 5A shows an investment chart 154 which illustrates a Triangle Breakup pattern, a strong buy signal. In the past two months the investment price 156 has consolidated with declining amplitude (as illustrated by the two range lines 158, 160) and volume. At present, it breaks out above the upper range line with high volume, signaling a possible new up trend. Similarly, FIG. 5B shows an investment chart 154 which illustrates a Triangle Breakdown pattern, a strong sell signal. In the past two months the investment price 164 has consolidated with declining amplitude (as illustrated by the two range lines 166, 168) and volume. At present, it breaks out below the lower range line with high volume, signaling a possible new down trend.

Figure 6:
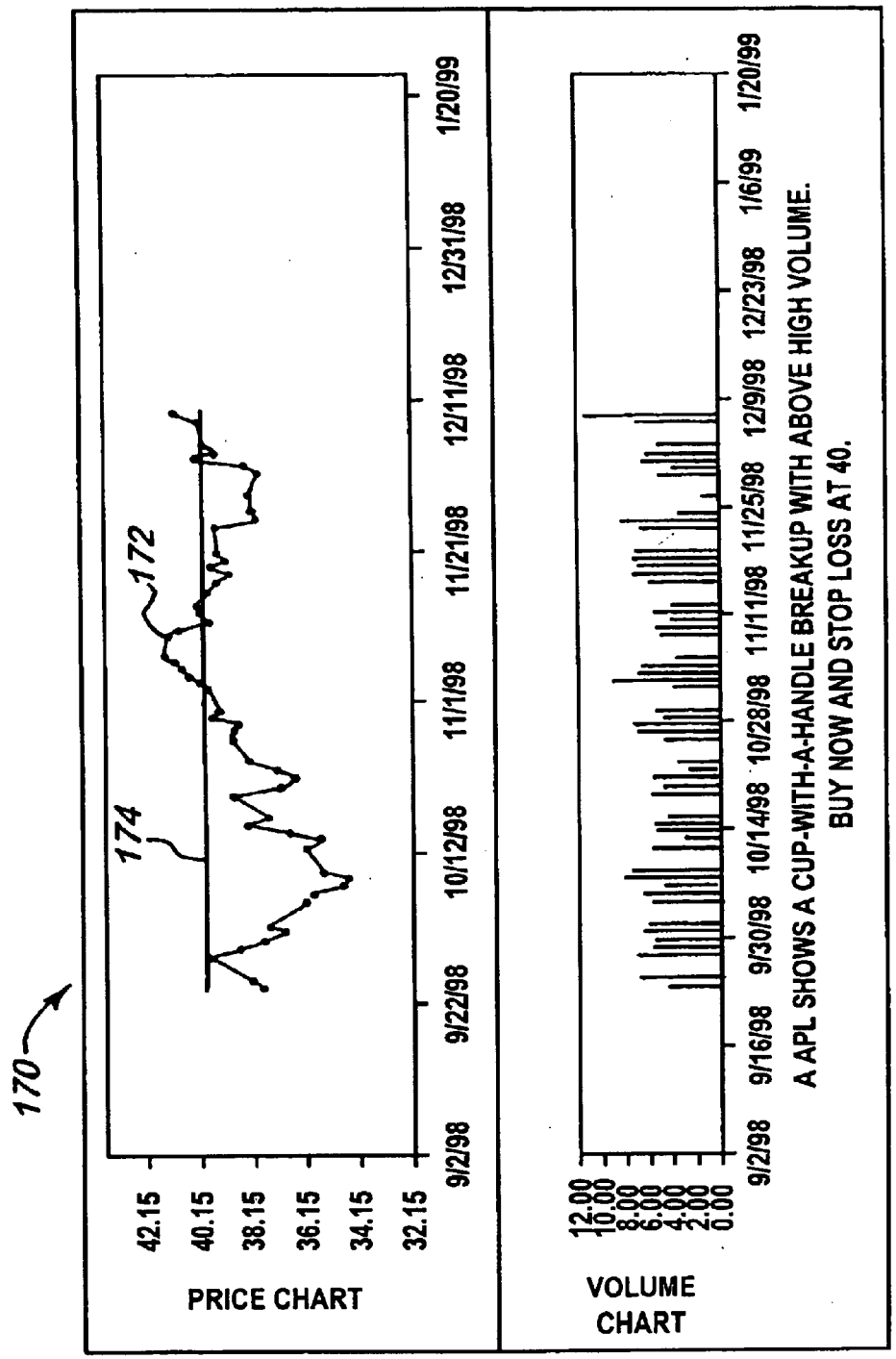
FIG. 6 is a schematic view of a investment chart illustrating a cup-with-a-handle investment chart patterns.

Another type of investment chart pattern is known as the "Cup-With-A-Handle" pattern. In FIG. 6 an investment chart 170 illustrating a typical Cup-With-A-Handle breakup pattern is shown. The strategy is to buy the investment as the price 172 breaks up with larger than average volume, then cut losses if it drops back to the pre-breakup level 174. If it goes up as expected, this pattern calls for successively raising the stop levels, giving the trade a chance to capture most of the up potential. The Cup-With-A-Handle breakup pattern is a strong buy signal, and according to statistics, investment prices rise 70% of the time after such a breakup. However, according to extensive experience and historical testing, the opposite pattern of the Cup-With-A-Handle does not work nearly as well.

Figure 7A:
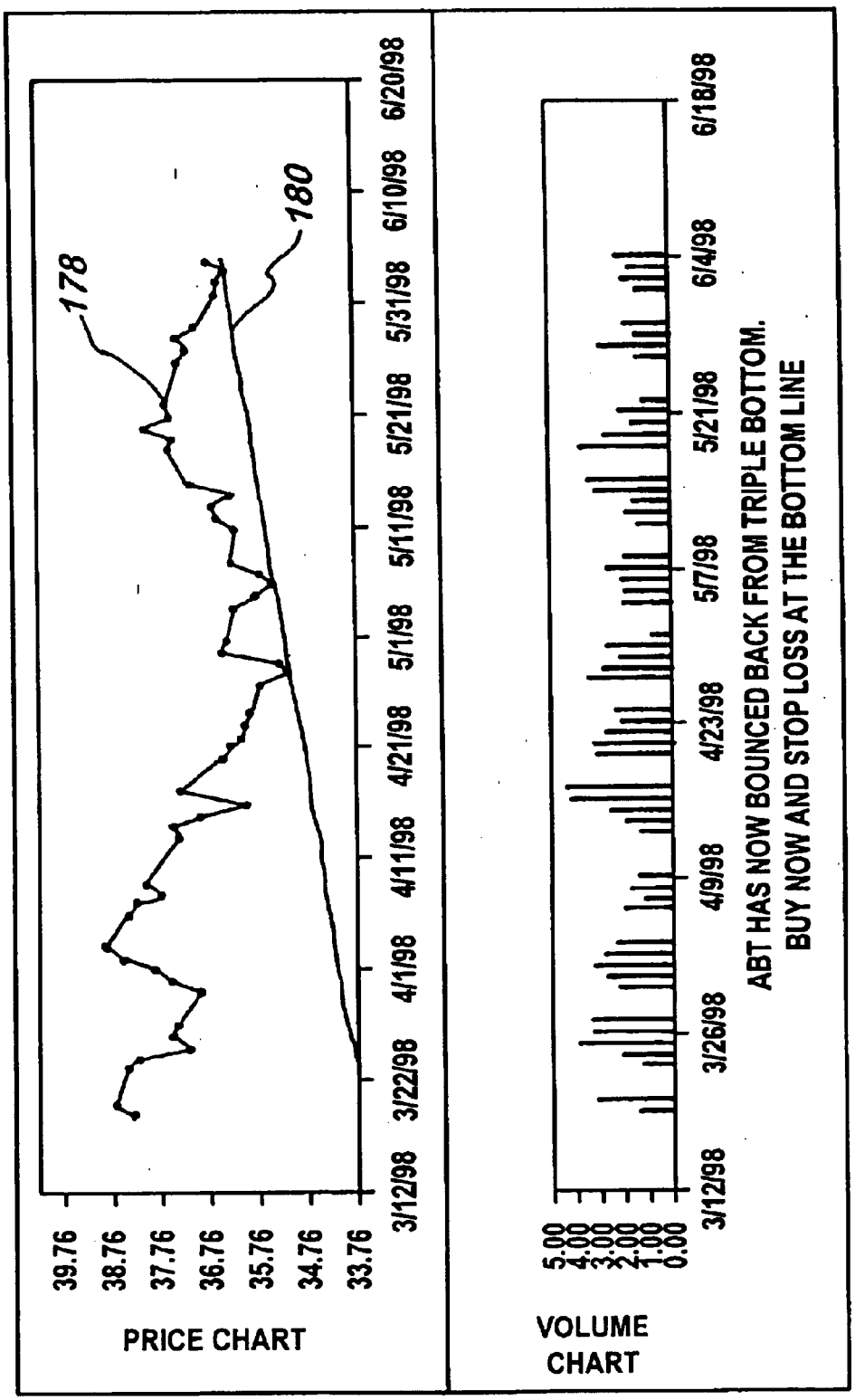
FIGS. 7A through 7C are schematic views of investment charts illustrating triple top/bottom investment chart patterns.
Figure 7B:
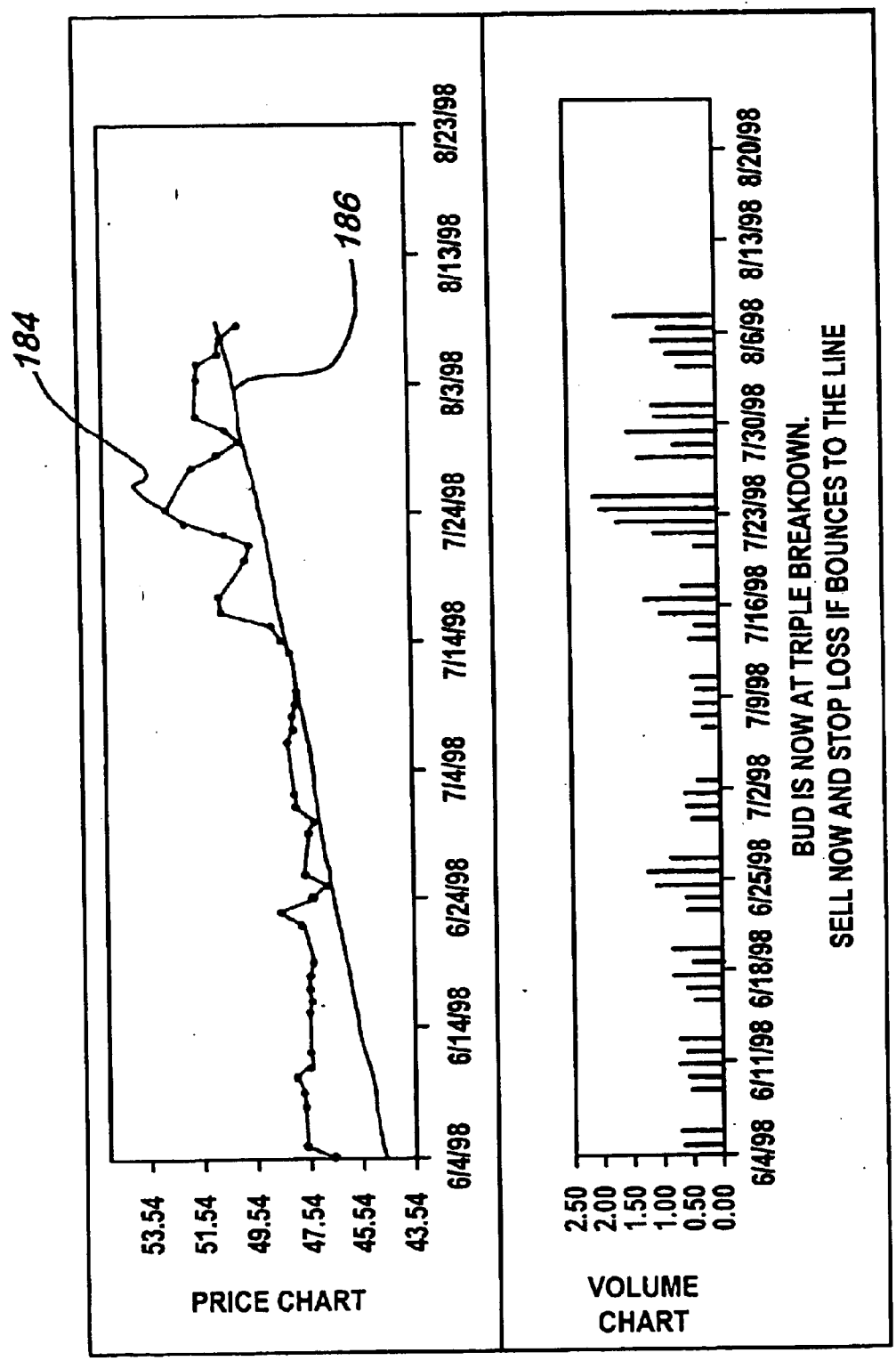
Figure 7C:
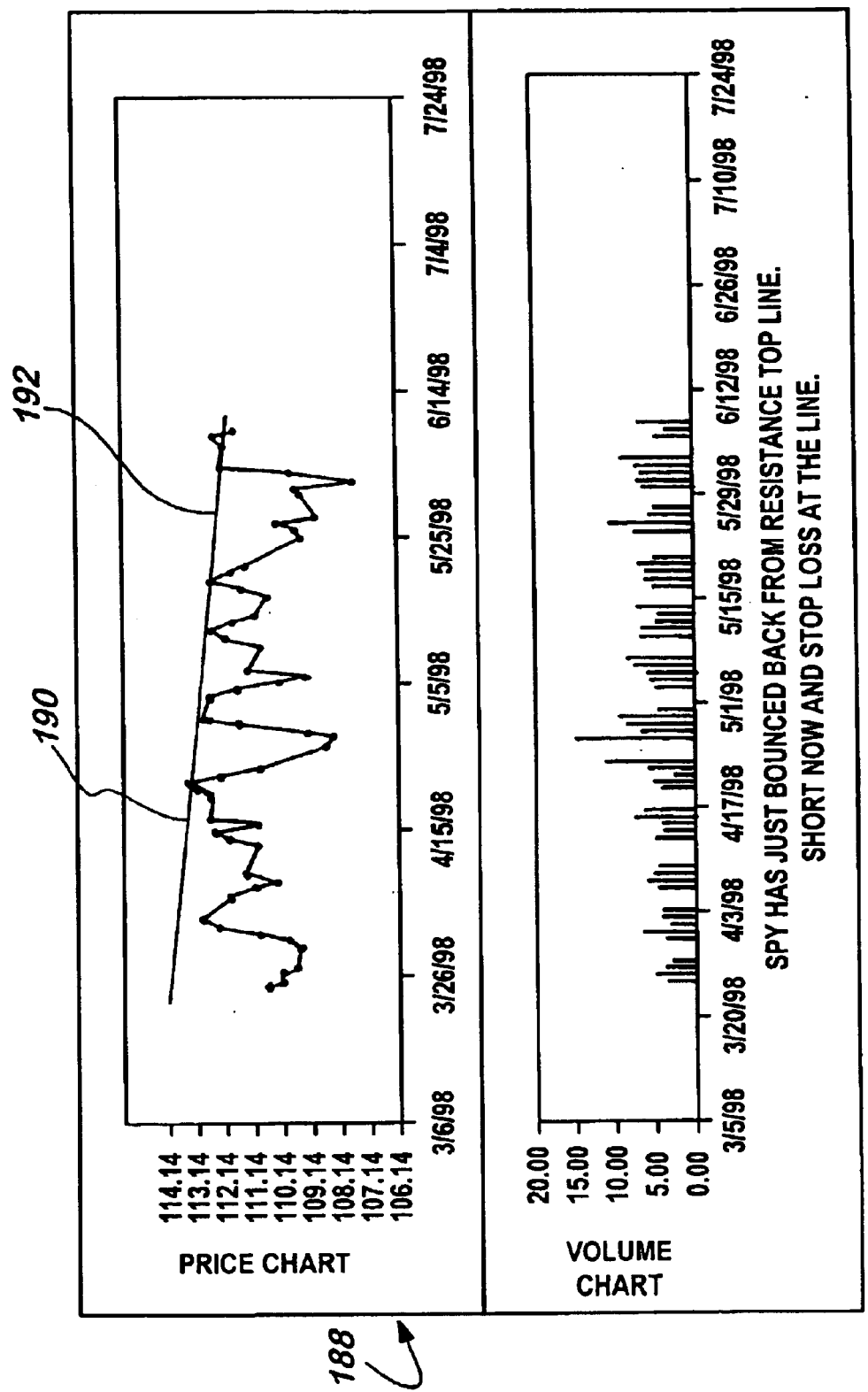

Referring now to FIGS. 7A through 7C, investment chart patterns known as "Triple Top/Bottom" patterns are shown. FIG. 7A shows an investment chart 176 which illustrates a bounce-back from an up-trend Triple Bottom, a buy signal. Risk involved is low, as one can sell the investment if its price 178 turns back and penetrates the line 180. FIG. 7B shows an investment chart 182 which illustrates a Triple Bottom breakdown with large volume, a sell signal. Risk is small because one can cover the short position if the investment price 184 turns back up to the line 186. FIG. 7C shows an investment chart 188 which illustrates a bounce-back from Triple Top, a sell signal. Again, one can cover if the investment price 190 turns back up to the line 192.

Figure 8A:
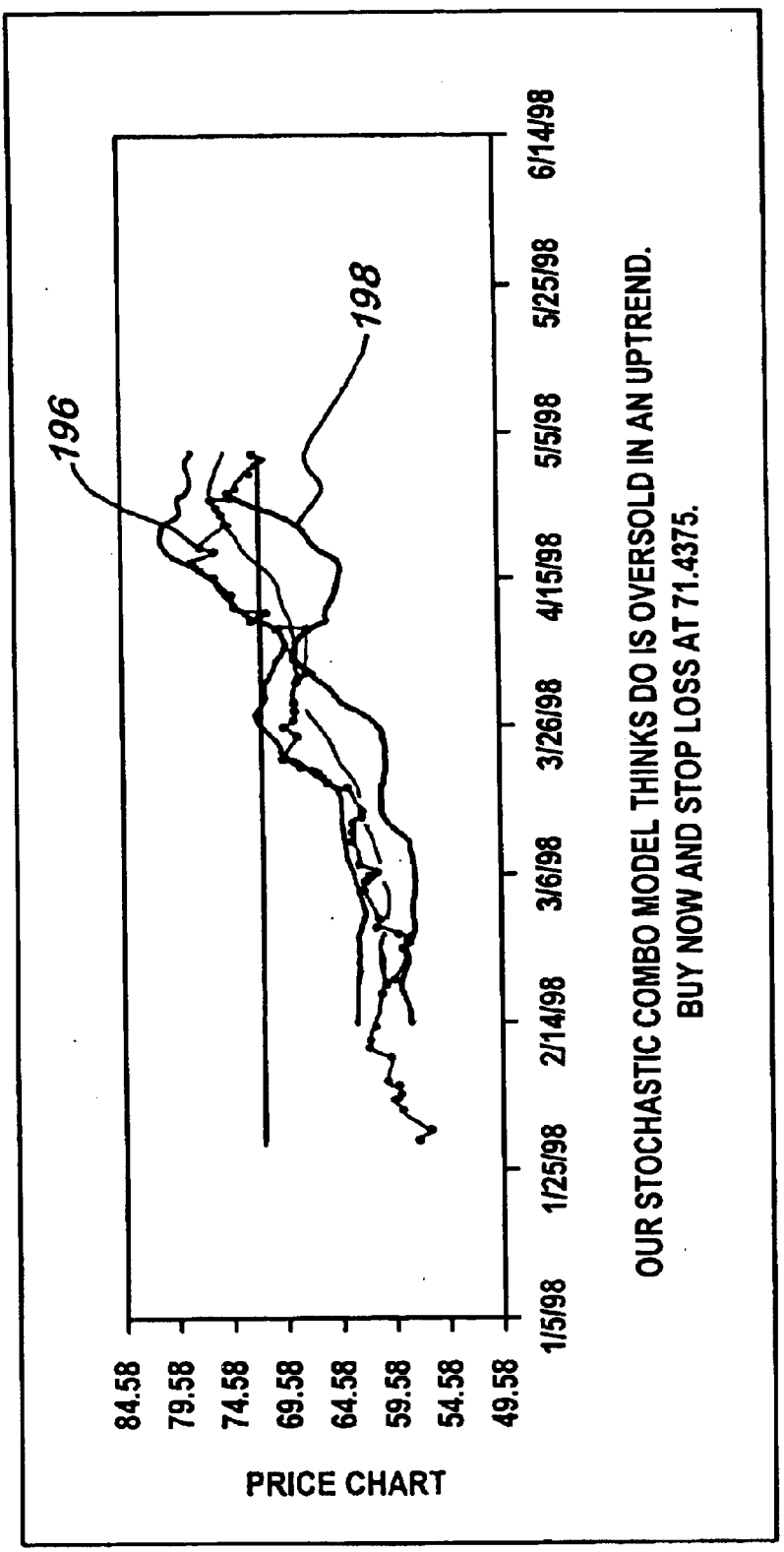
FIGS. 8A and 8B are schematic views of investment charts illustrating stochastic combo investment chart patterns.
Figure 8B:
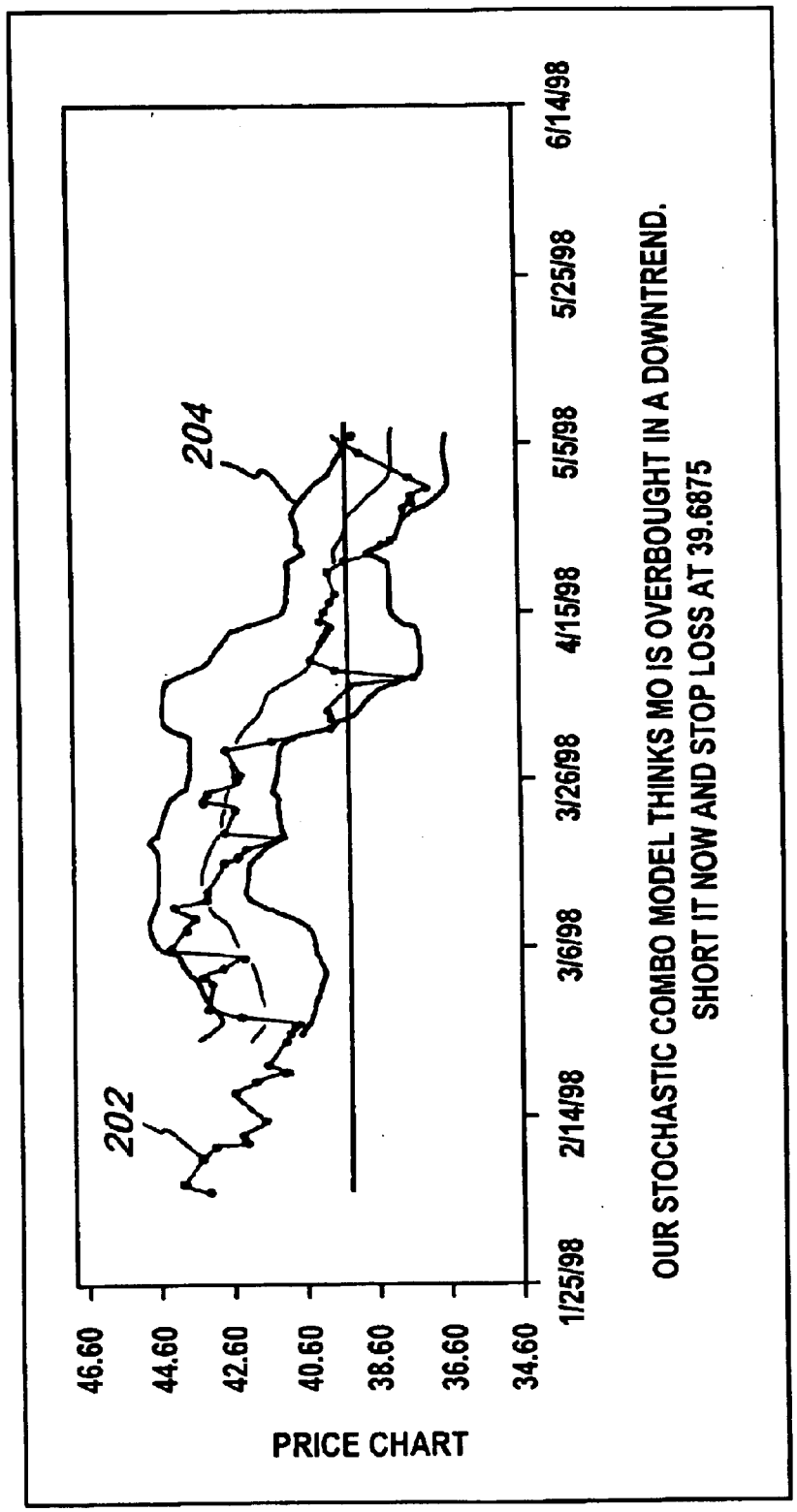

Investment chart patterns known as "Stochastic Combo" patterns are shown in FIGS. 8A and 8B. The Stochastic Combo trading strategy is based on the investment price satisfying a combination of conditions of the various technical indicators. For the buy signal, shown on investment chart 194 in FIG. 8A, the investment will have to show a long-term up trend, the momentum indicators will have to indicate that the investment is oversold, the RSI will have to be low, and the price 196 will have to be near the lower Bollinger Band 198, showing starting signs of bounce-back. For the sell signal, shown on investment chart 200 in FIG. 8B, the investment will have to show a long-term down trend. Momentum indicators will have to signal that the investment is overbought, that the RSI is high, that the MACD is favorable, and that the price 202 is close to the upper Bollinger Band 204, showing first signs of decline.

The trading strategy for both of these cases is to ride on a general trend and at the same time enhance profits by capturing the likely short-term mean reversion. If the investment moves as expected, one should hold until the price penetrates the center Bollinger Band (a 14-to-20-day moving average), or even until the price nears the opposite Bollinger Band. If, however, the price moves in the wrong direction, one should cut losses shortly after it goes beyond the prior day's intra-day extreme.

Figure 9A:
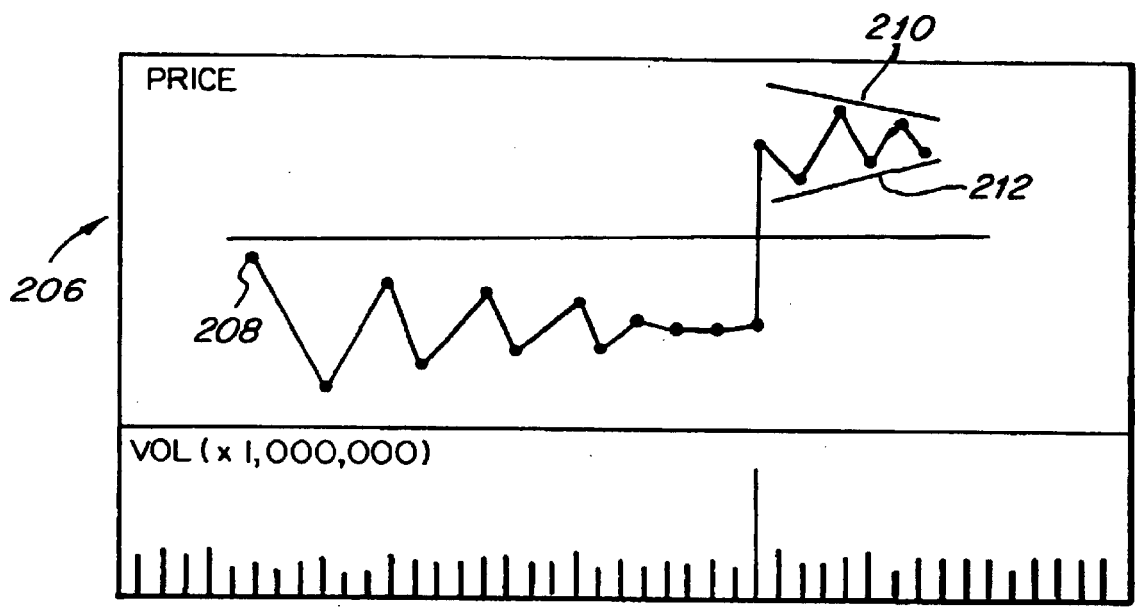
FIGS. 9A and 9B are schematic views of investment charts illustrating flag chart patterns.
Figure 9B:
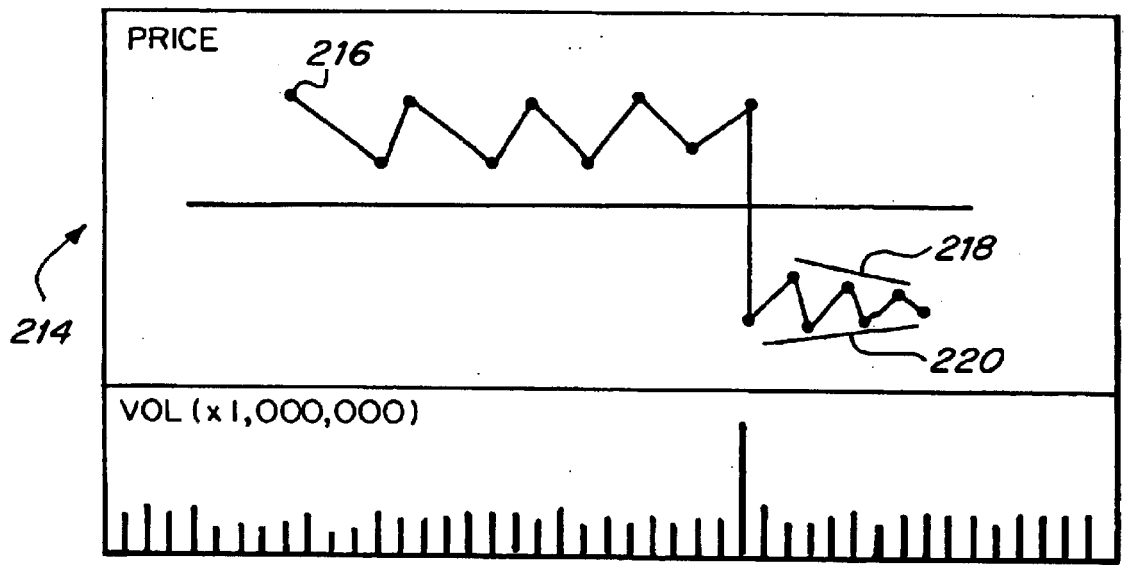

Another type of investment chart pattern is known as the "Flag" pattern. In FIG. 9A an investment chart 206 illustrating a typical Bullish Flag pattern, a buy signal, is shown. Note that the investment price 208 showed a dramatic increase with a high volume, and then that it has consolidated with declining amplitude (as illustrated by the two range lines 210, 214). Conversely, FIG. 9B shows an investment chart 214 illustrating a typical Bearish Flag pattern, a sell signal. Note that the investment price 216 showed a dramatic decrease with a high volume, and then that it has consolidated with declining amplitude (as illustrated by the two range lines 218, 220).

As discussed above, the above-described investment chart patterns, and their corresponding meanings, are known to those skilled in the art. However, traditionally a trader was required to sit at the screen of a trade station manually examining and reexamining, as market conditions and investment performance fluctuate, all the investment charts for numerous investments on the screen. This could require that the trader examine hundreds or even thousands of investment charts every day. Moreover, because investment chart patterns may be subtle, and therefore difficult to recognize, they may be easily missed by traders manually searching through numerous investment charts. Furthermore, because good signals are rare, it is difficult for traders to find them when they are still valid—by the time a trader recognizes a pertinent stock chart pattern, it may be too late to act on the pattern.

Figure 10:
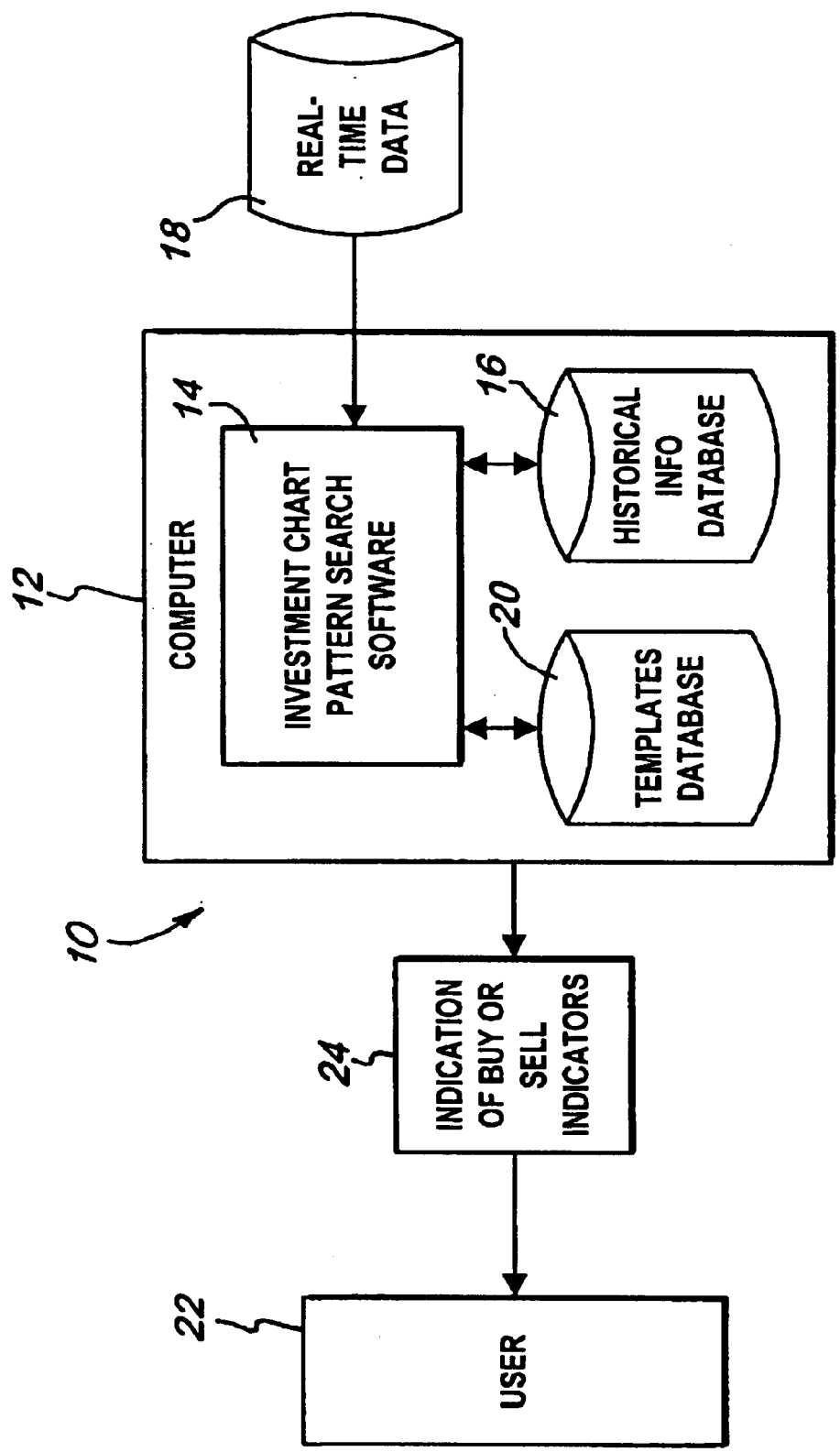
FIG. 10 is a block diagram of an investment chart pattern search system for technical analysis in accordance with the present invention.

Referring now to FIG. 10, the present invention remedies these, and other, deficiencies of the prior art by providing an investment chart pattern search system 10 for technical analysis. System 10 includes a computer 12 having executing thereon investment chart pattern search software 14. System 10 also includes a historical information database 16 accessible by computer 12 having stored thereon historical information relating to a plurality of financial investments. This historical information may comprise numerous types of information, but at a minimum includes information relating to past prices of the investments and past trading volumes of the financial investments. Historical information database 16 may comprise a part of computer 12, or may be remotely located and maintained.

In addition, computer 12 is in communication with a real-time data stream 18 which supplies continually updating real-time information relating to a plurality of financial investments. Like the historical information stored on historical information database 16, the real-time data supplied by data stream 18 may comprise numerous types of information, but at a minimum includes information relating to current prices of the investments and current trading volumes of the financial investments. System also includes a templates database 20, which has a plurality of various templates stored thereon, the configuration and purpose of which are described fully below.

Computer 12, and more particularly investment chart pattern search software 14, uses the historical information stored on historical information database 16, the real-time data supplied by data stream 18, and the templates stored on templates database 20 to generate and display to one or more users 22 indications of buy or sell indicators 24, as set forth in greater detail below with reference to FIGS. 11–15.

Figure 11:
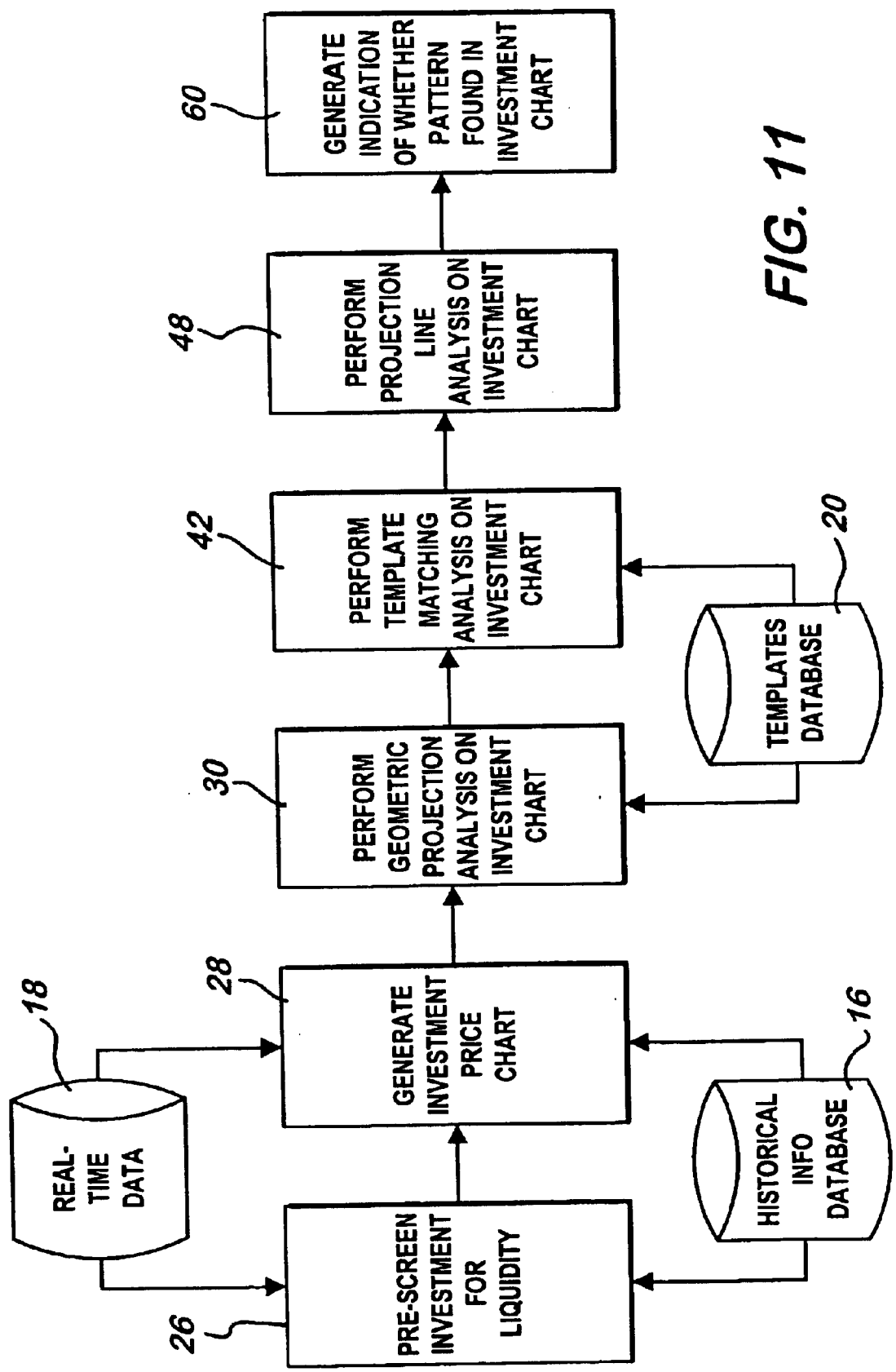
FIG. 11 is a block diagram of the methodology employed by the investment chart pattern search system for technical analysis of FIG. 10.
Figure 12:
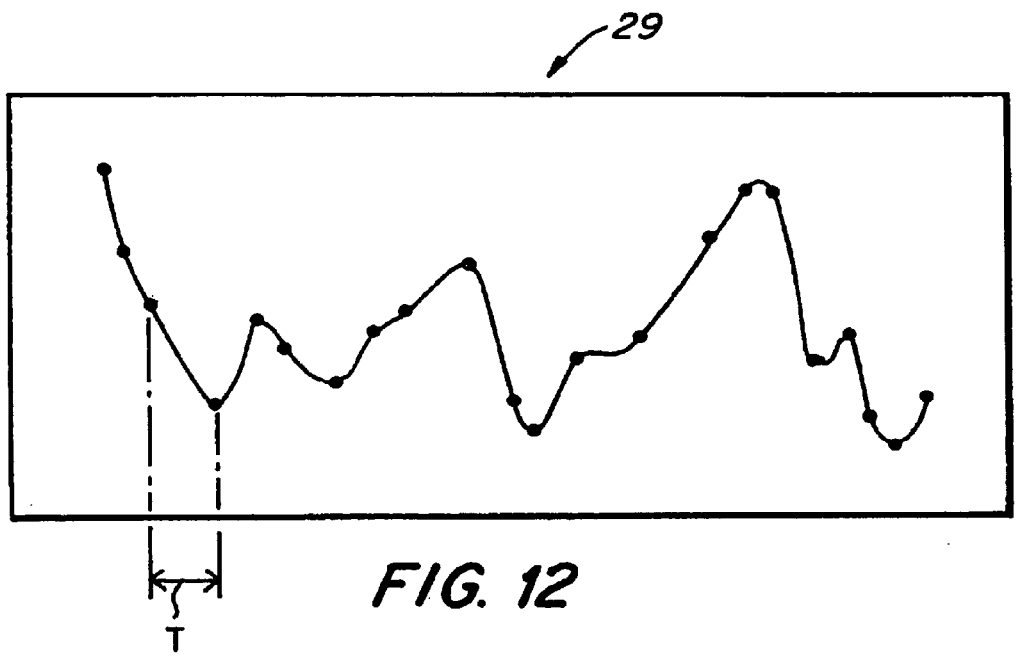
FIG. 12 is a schematic view showing am investment chart generated by the investment chart pattern search system for technical analysis of FIG. 10.

Referring first to FIG. 11, the overall methodology by which investment chart pattern search software 14 operates is shown. As a preliminary matter, it should be noted that system 10 can be configured to check substantially any number of investments. For example, system 10 may be configured to check all stocks on the three major exchanges (NYSE, AMEX and NASDAQ), the stocks on only one or two of the exchanges, particular stocks on the exchanges, or other investments in other markets. To maximize utility, system 10 is preferably configured to check all stocks on the three major exchanges.

First, at 26, historical information is retrieved from historical information database 16, and real-time data is received from data stream 18. This information is used to determine if the particular investment being examined meets a predetermined liquidity threshold. Stocks which do not meet this threshold are excluded, and system 10 moves on to examine the next investment. For example, stocks having low average daily volumes and low prices may be excluded. More specifically, for all breakout patterns, the current day's trading volume will have to be higher than the average daily volume; investments that do not show a higher proportional current trading volume are excluded. This pre-screening process greatly increases search speed by excluding at an early stage undesirable investments.

If the investment being examined meets the pre-screening criteria at 26, investment chart pattern search software 14 then uses historical information retrieved from historical information database 16 and real-time data received from data stream 18 to generate, at 28, an investment chart for the investment being examined. The investment chart may include numerous information, but at a minimum includes an indication of the historical and current pricing of the investment. Many systems and methods for generating and plotting investment charts are known, and therefore, the specific methodology for generating the investment charts is not discussed in detail herein.

It should be noted, however, that the time interval between successive points on the investment chart may be varied. More specifically, and as illustrated on investment chart 29 of FIG. 12, the time intervals T between points on investment chart 29 may comprise days (as is typical of known charts), or may comprise intraday intervals, such as hours or minutes. Such intraday intervals allow the identification of patterns sooner and with greater accuracy than if daily time intervals are used, particularly when the pattern is subtle.

Figure 13:
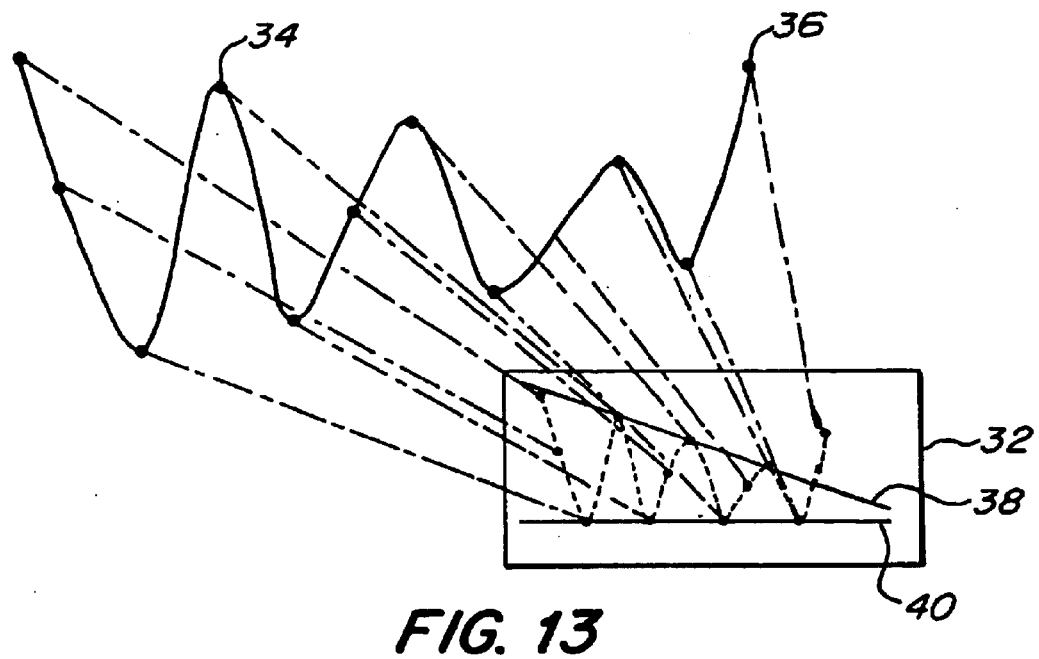
FIG. 13 is a schematic view showing greater detail of one of the particular analysis methods used in the methodology of FIG. 11.

Next, investment chart pattern search software 14 employs a geometric projection analysis, at 30, to determine whether certain patterns exist in the investment chart. Although not so limited, this analysis is particularly well-suited to identify range breakout and triangle breakout pattern. In order to perform this analysis, investment chart pattern search software 14 first retrieves from templates database 20 a template which is applicable for a particular type of investment chart pattern. For example, as shown in FIG. 13, the retrieved template may comprise a triangle breakout pattern template 32.

Investment chart pattern search software 14 then projects the investment chart 34 for the investment being examined onto the template with varying dilations, translations and rotations. It should be noted that the last point 36 on investment chart 34, representing the most current pricing information, is not used at this stage. Investment chart pattern search software 14 then determines the number of edges of investment chart 34 which hit the border lines 38, 40 of template 32, and computes the ratio of the number of these hitting edge points to the total number of points in order to determine the level of resemblance to the template 32. If the level of resemblance of the investment chart 34 to the template 32 is greater than a threshold value, the last point 36 of investment chart 34 is examined to determine whether it is a breakup or breakdown. If the level of resemblance of the investment chart 34 to the template 32 is not greater than the threshold value, other templates (i.e., other triangle breakout pattern templates, range breakout templates, and other types of pattern templates) are retrieved and compared to the investment chart in a similar manner.

Investment chart pattern search software 14 next employs a template matching analysis, at 42, to determine whether certain patterns exist in the investment chart. This analysis is particularly well-suited to identify those patterns not readily identifiable by the geometric projection analysis described above, and the projection line analysis described below. For example, the template matching analysis may be used to search for cup-with-a-handle patterns and head and shoulder patterns.

Figure 14A:
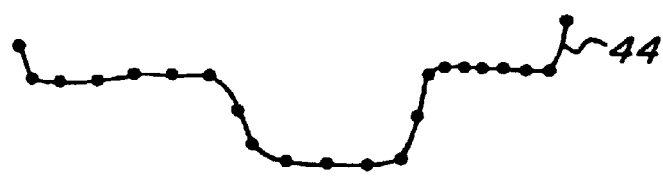
FIGS. 14A and 14B are schematic views showing templates which may be used with one of the particular analysis methods used in the methodology of FIG. 11.
Figure 14B:

In order to perform the template matching analysis, investment chart pattern search software 14 first retrieves from templates database 20 a template which is applicable for a particular type of investment chart pattern. For example, the retrieved template may comprise a cup-with-a-handle pattern template 44 (FIG. 14A) or a head-and-shoulders pattern template 46 (FIG. 14B).

Investment chart pattern search software 14 then projects the investment chart for the investment being examined onto the template, and determines a correlation coefficient between the investment chart and the pattern. If the correlation coefficient is above a threshold value, a match is found. If the correlation coefficient is not above a threshold value, other templates are retrieved and compared to the investment chart in a similar manner. As various mathematical methods are known for determining a correlation coefficient between two graphs, such a process is not described herein in detail. It should be noted however, that setting the threshold value for the correlation coefficient at 0.9 has produced acceptable results.

It should also be noted that the number of templates with which the investment chart is compared will directly impact the effectiveness of the search. In other words, the more templates that are provided for each pattern (i.e., the cup-with-a-handle pattern, the head-and-shoulders pattern, etc.) the better the chances of accurately identifying that the pattern exists in the investment chart. However, the greater the number of templates provided, the greater the time required for the analysis. It has been found that providing on the order of several hundred templates for each pattern being investigated provides excellent matching results, while also providing acceptable analysis times.

Investment chart pattern search software 14 then employs a projection line analysis, at 48, to determine whether certain patterns exist in the investment chart. Although not so limited, this analysis is particularly well-suited to identify triple top/bottom patterns in investment charts.

Figure 15:
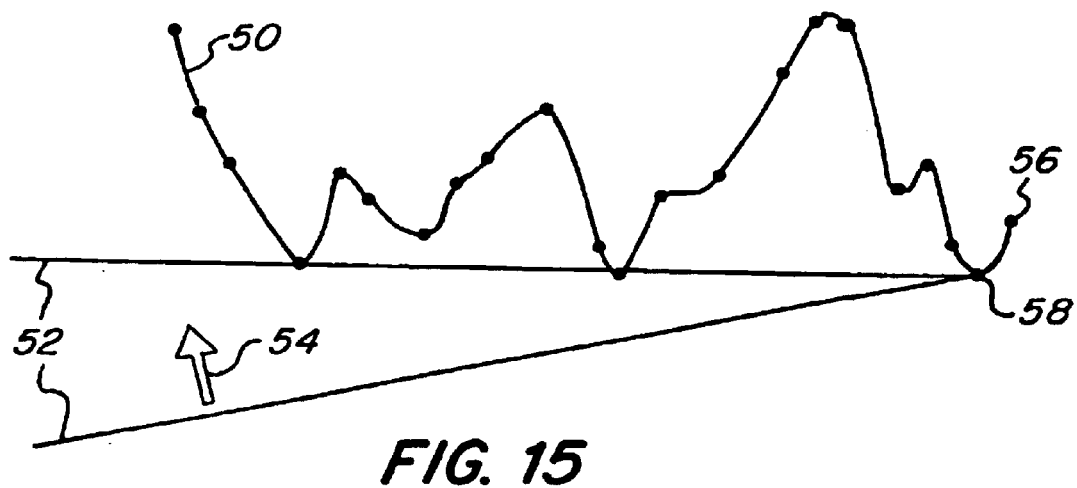
FIG. 15 is a schematic view showing greater detail of one of the particular analysis methods used in the methodology of FIG. 11.

In order to perform the projection line analysis, investment chart pattern search software 14 begins with the investment chart 50 for the investment being examined. Investment chart pattern search software 14 then generates projecting lines 52 with all different angles (represented by arrow 54) from the last point 56 and the second to last point 58 (as shown in FIG. 15) of investment chart 50 to find the borderline to which the entire graph is on one side. Investment chart pattern search software 14 then determines the number of points that are on the borderline, or within a small tolerance thereof. If the points are sufficiently far apart, and the number of points on the borderline, or within a small tolerance thereof, if three or more, then investment chart pattern search software 14 determines that a triple top/bottom pattern is present, and examines the position of the last point with respect to the line to determine whether it is a breakout or a bounce back.

Finally, investment chart pattern search software 14, at 60, generates an indication 24 of whether any buy or sell indicator patterns were found for the investment being examined. Indicator 24 may comprise a textual indication that a pattern was found (e.g. "ABC stock shows a Cup-With-A-Handle breakup with above average volume. Buy now and stop loss at 40"), or may comprise a graphical indication that a pattern was found. For example, if a triangle breakout pattern is found, the indication may comprise a pattern projection of the appropriate triangle breakout pattern on a stock chart (as shown in FIGS. 5A and 5B) which is displayed to the user. Of course, the indication may comprise both a textual indication and a graphical indication in combination. The indicator 24 may then be transmitted to user 22, as shown in FIG. 10. Investment chart pattern search software 14 then moves on to the next investment to be examined and repeats the above process.

The present invention, therefore, provides an automated system for assisting investors in deciding whether to buy or sell investments which automatically analyzes investments to determine if buy or sell indicators are present, which is capable of automatically analyzing a large number of investments without requiring user input, which is capable of quickly identifying buy or sell indicators so that they can be acted upon while they are still valid, which automatically analyzes investment charts to draw conclusions about investments, which is capable of identifying a variety of pertinent investment chart patterns indicative of buy or sell indicators, and which is capable of detecting subtle investment chart patterns which may otherwise be missed by an individual manually examining investment charts.

Although the invention has been described with reference to a particular arrangement of parts, features and the like, these are not intended to exhaust all possible arrangements or features, and indeed many other modifications and variations will be ascertainable to those of skill in the art.

What is claimed is:

1. An automated investment chart pattern search system comprising:
   a computer;
   a historical information database accessible by said computer, said historical information database having historical information for a plurality of investments stored thereon;
   a connection to a supply of real-time data, said real time data comprising real-time data relating to a plurality of investments;
   a templates database accessible by said computer, said templates database having a plurality of templates stored thereon;
   software executing on said computer for generating an investment chart for the investment to be examined based upon the historical information and the real-time data relating to the investment to be examined;

software executing on said computer for retrieving at least one template from said templates database, and for performing geometric projection analysis on the retrieved template and the investment chart to determine if a pattern exists in the investment chart;

software executing on said computer for retrieving at least one template from said templates database, and for performing template matching analysis on the retrieved template and the investment chart to determine if a pattern exists in the investment chart; and software executing on said computer for performing projection line analysis on the investment chart to determine if a pattern exists in the investment chart.

2. The system of claim 1 further comprising software executing on said computer for pre-screening the historical information and the real-time data relating to an investment to be examined to determine whether the investment to be examined meets a threshold value for liquidity, and wherein said software executing on said computer performs the geometric projection analysis, the template matching analysis and the projection line analysis if the investment to be examined meets the threshold value for liquidity.

3. The system of claim 2 wherein the investment to be examined is determined to meet the threshold value for liquidity if both average daily trading volumes and average daily prices for the investment to be determined meet a threshold value.

4. The system of claim 2 wherein the investment to be examined is determined to meet the threshold value for liquidity if the current day's trading volume is higher than average daily trading volumes.

5. The system of claim 1 further comprising software executing on said computer for, if it is determined that a pattern exists in the investment chart, generating and transmitting to a user an indication that a pattern has been found.

6. The system of claim 5 wherein the indication comprises a textual indication.

7. The system of claim 5 wherein the indication comprises a graphical indication.

8. The system of claim 1 wherein a time interval between successive points on the investment chart comprises an intraday time interval.

9. The system of claim 1 wherein said software executing on said computer for retrieving at least one template from said templates database, and for performing geometric projection analysis on the retrieved template and the investment chart to determine if a pattern exists in the investment chart comprises:

software executing on said computer for retrieving a template from said templates database;

software executing on said computer for projecting the investment chart onto the retrieved template with varying dilations, translations and rotations;

software executing on said computer for determining a number of edge points of the investment chart which hit border lines of the template, and for computing a ratio of the number of hitting edge points to the total number of edge points in order to determine a level of resemblance of the investment chart to the template; and software executing on said computer for determining that a pattern exists in the investment chart if the level of resemblance is greater than a threshold value.

10. The system of claim 9 wherein said software executing on said computer for retrieving at least one template from said templates database, and for performing geometric projection analysis on the retrieved template and the investment chart to determine if a pattern exists in the investment chart further comprises software executing on said computer for examining a last point of the investment chart to determine whether it is a breakup or breakdown.

11. The system of claim 9 wherein the template is a range breakout pattern template.

12. The system of claim 9 wherein the template is a triangle breakout pattern template.

13. The system of claim 1 wherein said software executing on said computer for retrieving at least one template from said templates database, and for performing template matching analysis on the retrieved template and the investment chart to determine if a pattern exists in the investment chart comprises:

software executing on said computer for retrieving a template from said templates database;

software executing on said computer for projecting the investment chart onto the template, and determining a correlation coefficient between the investment chart and the pattern; and software executing on said computer for determining that a pattern exists in the investment chart if the correlation coefficient is greater than a threshold value.

14. The system of claim 13 wherein the threshold value is 0.9.

15. The system of claim 13 wherein the template is a cup-with-a-handle pattern template.

16. The system of claim 13 wherein the template is a head-and-shoulders pattern template.

17. The system of claim 1 wherein said software executing on said computer for performing projection line analysis on the investment chart to determine if a pattern exists in the investment chart comprises:

software executing on said computer for generating projecting lines with varying angles from a point on the investment chart to find a borderline to which the entire graph is on one side;

software executing on said computer for determining a number of points on the investment chart that fall on the borderline within a small tolerance thereof; and software executing on said computer for determining that a triple top/bottom pattern is present in the investment chart if the number of points on the investment chart that fall on the borderline within a small tolerance thereof is three or more.

18. The system of claim 17 wherein said software executing on said computer for performing projection line analysis on the investment chart to determine if a pattern exists in the investment chart further comprises software executing on said computer for examining a last point of the investment chart to determine whether it is a breakout or a bounce back.

19. The system of claim 17 wherein the point on the investment chart from which the projecting lines are generated comprises the last point on the investment chart.

20. The system of claim 17 wherein the point on the investment chart from which the projecting lines are generated comprises the second to last point on the investment chart.

21. An automated investment chart pattern search system comprising:

a computer;

a historical information database accessible by said computer, said historical information database having historical information for a plurality of investments stored thereon;

a connection to a supply of real-time data, said real time data comprising real-time data relating to a plurality of investments;

a templates database accessible by said computer, said templates database having a plurality of templates stored thereon;

software executing on said computer for generating an investment chart for the investment to be examined based upon the historical information and the real-time data relating to the investment to be examined;

software executing on said computer for retrieving a template from said templates database and for projecting the investment chart onto the retrieved template with varying dilations, translations and rotations;

software executing on said computer for determining a number of edge points of the investment chart which hit border lines of the template, and for computing a ratio of the number of hitting edge points to the total number of edge points in order to determine a level of resemblance of the investment chart to the template; and software executing on said computer for determining that a pattern exists in the investment chart if the level of resemblance is greater than a threshold value.

22. The system of claim 21 further comprising software executing on said computer for examining a last point of the investment chart to determine whether it is a breakup or breakdown.

23. The system of claim 21 wherein the template is a range breakout pattern template.

24. The system of claim 21 wherein the template is a triangle breakout pattern template.

25. An automated investment chart pattern search system comprising:
a computer;
a historical information database accessible by said computer, said historical information database having historical information for a plurality of investments stored thereon;
a connection to a supply of real-time data, said real time data comprising real-time data relating to a plurality of investments;
a templates database accessible by said computer, said templates database having a plurality of templates stored thereon;
software executing on said computer for generating an investment chart for the investment to be examined based upon the historical information and the real-time data relating to the investment to be examined;
software executing on said computer for retrieving a template from said templates database, for projecting the investment chart onto the template, and for determining a correlation coefficient between the investment chart and the pattern; and
software executing on said computer for determining that a pattern exists in the investment chart if the correlation coefficient is greater than a threshold value.

26. The system of claim 25 wherein the threshold value is 0.9.

27. The system of claim 25 wherein the template is a cup-with-a-handle pattern template.

28. The system of claim 25 wherein the template is a head-and-shoulders pattern template.

29. An automated investment chart pattern search system comprising:
computer;
a historical information database accessible by said computer, said historical information database having historical information for a plurality of investments stored thereon;
a connection to a supply of real-time data, said real time data comprising real-time data relating to a plurality of investments;
software executing on said computer for generating an investment chart for the investment to be examined based upon the historical information and the real-time data relating to the investment to be examined;
software executing on said computer for generating projecting lines with varying angles from a point on the investment chart to find a borderline to which the entire graph is on one side;
software executing on said computer for determining a number of points on the investment chart that fall on the borderline within a small tolerance thereof; and
software executing on said computer for determining that a triple top/bottom pattern is present in the investment chart if the number of points on the investment chart that fall on the borderline within a small tolerance thereof is three or more.

30. The system of claim 29 further comprising software executing on said computer for examining a last point of the investment chart to determine whether it is a breakout or a bounce back.

31. The system of claim 29 wherein the point on the investment chart from which the projecting lines are generated comprises the last point on the investment chart.

32. The system of claim 29 wherein the point on the investment chart from which the projecting lines are generated comprises the second to last point on the investment chart.

33. An automated investment chart pattern search method comprising the steps of:
providing a computer;
providing a historical information database accessible by the computer, the historical information database having historical information for a plurality of investments stored thereon;
providing a connection to a supply of real-time data, the real time data comprising real-time data relating to a plurality of investments;
providing a templates database accessible by the computer, the templates database having a-plurality of templates stored thereon;
generating an investment chart for the investment to be examined based upon the historical information and the real-time data relating to the investment to be examined;
retrieving at least one template from the templates database, and performing geometric projection analysis on the retrieved template and the investment chart to determine if a pattern exists in the investment chart;
retrieving at least one template from the templates database, and performing template matching analysis on the retrieved template and the investment chart to determine if a pattern exists in the investment chart; and
performing projection line analysis on the investment chart to determine if a pattern exists in the investment chart.

34. The method of claim 33 further comprising the step of pre-screening the historical information and the real-time data relating to an investment to be examined to determine whether the investment to be examined meets a threshold value for liquidity, and wherein said steps of performing the geometric projection analysis, performing the template matching analysis and performing projection line analysis are performed only if the investment to be examined meets the threshold value for liquidity.

35. The method of claim 34 wherein the investment to be examined is determined to meet the threshold value for liquidity if both average daily trading volumes and average daily prices for the investment to be determined meet a threshold value.

36. The method of claim 34 wherein the investment to be examined is determined to meet the threshold value for liquidity if the current day's trading volume is higher than average daily trading volumes.

37. The method of claim 33 further comprising the step of, if it is determined that a pattern exists in the investment chart, generating and transmitting to a user an indication that a pattern has been found.

38. The method of claim 37 wherein the indication comprises a textual indication.

39. The method of claim 37 wherein the indication comprises a graphical indication.

40. The method of claim 33 wherein a time interval between successive points on the investment chart comprises an intraday time interval.

41. The method of claim 33 wherein said step of retrieving at least one template from said templates database, and performing geometric projection analysis on the retrieved template and the investment chart to determine if a pattern exists in the investment chart comprises the steps of:
   retrieving a template from the templates database;
   projecting the investment chart onto the retrieved template with varying dilations, translations and rotations;
   determining a number of edge points of the investment chart which hit border lines of the template, and computing a ratio of the number of hitting edge points to the total number of edge points in order to determine a level of resemblance of the investment chart to the template; and
   determining that a pattern exists in the investment chart if the level of resemblance is greater than a threshold value.

42. The method of claim 41 wherein said step of retrieving at least one template from said templates database, and performing geometric projection analysis on the retrieved template and the investment chart to determine if a pattern exists in the investment chart further comprises the step of examining a last point of the investment chart to determine whether it is a breakup or breakdown.

43. The method of claim 41 wherein the template is a range breakout pattern template.

44. The method of claim 41 wherein the template is a triangle breakout pattern template.

45. The method of claim 33 wherein said step of retrieving at least one template from said templates database, and for performing template matching analysis on the retrieved template and the investment chart to determine if a pattern exists in the investment chart comprises the steps of:
   retrieving a template from said templates database;
   projecting the investment chart onto the template, and determining a correlation coefficient between the investment chart and the pattern; and
   determining that a pattern exists in the investment chart if the correlation coefficient is greater than a threshold value.

46. The method of claim 45 wherein the threshold value is 0.9.

47. The method of claim 45 wherein the template is a cup-with-a-handle pattern template.

48. The method of claim 45 wherein the template is a head-and-shoulders pattern template.

49. The method of claim 33 wherein said step of performing projection line analysis on the investment chart to determine if a pattern exists in the investment chart comprises the steps of:
   generating projecting lines with varying angles from a point on the investment chart to find a borderline to which the entire graph is on one side;
   determining a number of points on the investment chart that fall on the borderline within a small tolerance thereof; and
   determining that a triple top/bottom pattern is present in the investment chart if the number of points on the investment chart that fall on the borderline within a small tolerance thereof is three or more.

50. The method of claim 49 wherein said step of performing projection line analysis on the investment chart to determine if a pattern exists in the investment chart further comprises the step of examining a last point of the investment chart to determine whether it is a breakout or a bounce back.

51. The method of claim 49 wherein the point on the investment chart from which the projecting lines are generated comprises the last point on the investment chart.

52. The method of claim 49 wherein the point on the investment chart from which the projecting lines are generated comprises the second to last point on the investment chart.

53. An automated investment chart pattern search method comprising the steps of:
   providing a computer;
   providing a historical information database accessible by the computer, the historical information database having historical information for a plurality of investments stored thereon;
   providing a connection to a supply of real-time data, the real time data comprising real-time data relating to a plurality of investments;
   providing a templates database accessible by the computer, the templates database having a plurality of templates stored thereon;
   generating an investment chart for the investment to be examined based upon the historical information and the real-time data relating to the investment to be examined;
   retrieving a template from the templates database and projecting the investment chart onto the retrieved template with varying dilations, translations and rotations;
   determining a number of edge points of the investment chart which hit border lines of the template, and computing a ratio of the number of hitting edge points to the total number of edge points in order to determine a level of resemblance of the investment chart to the template; and
   determining that a pattern exists in the investment chart if the level of resemblance is greater than a threshold value.

54. The method of claim 53 further comprising the step of examining a last point of the investment chart to determine whether it is a breakup or breakdown.

55. The method of claim 53 wherein the template is a range breakout pattern template.

56. The method of claim 53 wherein the template is a triangle breakout pattern template.

57. An automated investment chart pattern search method comprising the steps of:

provided a computer;

providing a historical information database accessible by the computer, the historical information database having historical information for a plurality of investments stored thereon;

providing a connection to a supply of real-time data, the real time data comprising real-time data relating to a plurality of investments;

providing a templates database accessible by the computer, the templates database having a plurality of templates stored thereon;

generating an investment chart for the investment to be examined based upon the historical information and the real-time data relating to the investment to be examined;

retrieving a template from the templates database, projecting the investment chart onto the template, and determining a correlation coefficient between the investment chart and the pattern; and determining that a pattern exists in the investment chart if the correlation coefficient is greater than a threshold value.

58. The method of claim 57 wherein the threshold value is 0.9.

59. The method of claim 57 wherein the template is a cup-with-a-handle pattern template.

60. The method of claim 57 wherein the template is a head-and-shoulders pattern template.

61. An automated investment chart pattern search method comprising the steps of:

providing a computer;

providing a historical information database accessible by the computer, the historical information database having historical information for a plurality of investments stored thereon;

providing a connection to a supply of real-time data, the real time data comprising real-time data relating to a plurality of investments;

generating an investment chart for the investment to be examined based upon the historical information and the real-time data relating to the investment to be examined;

generating projecting lines with varying angles from a point on the investment chart to find a borderline to which the entire graph is on one side;

determining a number of points on the investment chart that fall on the borderline within a small tolerance thereof; and determining that a triple top/bottom pattern is present in the investment chart if the number of points on the investment chart that fall on the borderline within a small tolerance thereof is three or more.

62. The method of claim 61 further comprising the step of examining a last point of the investment chart to determine whether it is a breakout or a bounce back.

63. The method of claim 61 wherein the point on the investment chart from which the projecting lines are generated comprises the last point on the investment chart.

64. The method of claim 61 wherein the point on the investment chart from which the projecting lines are generated comprises the second to last point on the investment chart.

* * * * *

UNITED STATES PATENT AND TRADEMARK OFFICE
CERTIFICATE OF CORRECTION

PATENT NO. : 6,907,404 B1
DATED : June 14, 2005
INVENTOR(S) : Bin Li

It is certified that error appears in the above-identified patent and that said Letters Patent is hereby corrected as shown below:

<u>Title page,</u>
Item [73], Assignee, should read -- Westport Financial LLC, Westport, CT (US) --.

Signed and Sealed this

Twenty-second Day of November, 2005

JON W. DUDAS
*Director of the United States Patent and Trademark Office*